(12) United States Patent
Mizuno et al.

(10) Patent No.: US 8,037,273 B2
(45) Date of Patent: Oct. 11, 2011

(54) STORAGE SYSTEM LOGICAL STORAGE AREA ALLOCATING METHOD AND COMPUTER SYSTEM

(75) Inventors: Yoichi Mizuno, Yokohama (JP); Tomonori Murayama, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 443 days.

(21) Appl. No.: 12/267,675

(22) Filed: Nov. 10, 2008

(65) Prior Publication Data

US 2010/0057990 A1    Mar. 4, 2010

(30) Foreign Application Priority Data

Aug. 28, 2008 (JP) ................................. 2008-219547

(51) Int. Cl.
*G06F 12/08* (2006.01)

(52) U.S. Cl. ........................................ 711/170; 711/114
(58) Field of Classification Search ........................ None
See application file for complete search history.

(56) References Cited

U.S. PATENT DOCUMENTS

| 2005/0065961 A1* | 3/2005 | Aguren ......................... 707/102 |
| 2005/0091455 A1 | 4/2005 | Kano et al. |
| 2007/0180294 A1* | 8/2007 | Kameyama et al. .............. 714/6 |
| 2007/0266216 A1* | 11/2007 | Arakawa et al. .............. 711/165 |
| 2009/0157756 A1* | 6/2009 | Sanvido ......................... 707/200 |

FOREIGN PATENT DOCUMENTS

JP   2003-015915   1/2003

* cited by examiner

*Primary Examiner* — Gary Portka
(74) *Attorney, Agent, or Firm* — Antonelli, Terry, Stout & Kraus, LLP.

(57) ABSTRACT

A method for allocating optimum pages to a logical volume according to the usage of the logical volume and an access characteristic is provided. A storage system is connected to a host computer, includes plural disk drives and a controller to control the plural disk drives, includes a first disk drive group including at least one disk drive, holds information indicating that a first attribute is assigned to a logical volume, assigns the first attribute when a first logical volume including plural first logical storage areas is provided to the host computer, reserves plural physical storage areas of the first disk drive group as the plural first logical storage areas, reserves the plural first logical storage areas included in the first logical volume as storage areas for storing data requested by the host computer, and stores the data requested by the host computer into the allocated physical storage areas.

15 Claims, 18 Drawing Sheets

DISK MANAGEMENT TABLE

| RAID Group | RAID LEVEL | STRIPE LINE SIZE | INTERNAL LUN | LU SIZE | PHYSICAL DISK ADDRESS |
|---|---|---|---|---|---|
| 0 | 1 | 16 KB | 10 | 1 TB | A: 0-2000,<br>B: 0-2000,<br>⋮<br>N: 0-2000 |
| 1 | 5 | 1 MB | 11 | 500 GB | A: 2001-3000,<br>B: 2001-3000,<br>⋮<br>N: 2001-3000 |
|  |  |  | 12 | 500 GB | ⋮ |
| ⋮ | ⋮ | ⋮ | ⋮ | ⋮ | ⋮ |

FIG. 8

POOL MANAGEMENT TABLE 1182

| RAID Group 11821 | INTERNAL LUN 11822 | Page Number 11823 | LBA 11824 | Size 11825 | Reserve 11826 | In-use 11827 |
|---|---|---|---|---|---|---|
| 0 | 10 | 1 | 0 | 32 | Group0 | 1 |
|   |    | 2 | 32 | 32 | Group0 | 1 |
|   |    | 3 | 64 | 32 | Group0 | 1 |
|   |    | ... | ... | ... | ... | ... |
|   | 11 | 10 | 0 | 2048 | LUN2 | 1 |
|   |    | 11 | 2048 | 2048 | LUN2 | 0 |
|   |    | ... | ... | ... | ... | ... |
|   | 12 | 100 | 0 | 2048 | — | 0 |
|   |    | ... | ... | ... | ... | ... |
| 1 | ... | ... | ... | ... | ... | ... |
| ... |   |   |   |   |   |   |

FIG. 9

VIRTUAL VOLUME MANAGEMENT TABLE

1183

| LUN 11831 | CAPACITY 11832 | LUN LBA 11833 | Size 11834 | Page Number 11835 | VOLUME ATTRIBUTE 11836 |
|---|---|---|---|---|---|
| 0 | 2000 GB | 0 | 32 | 1 | — |
|  |  | 32 | 32 | 2 | — |
|  |  | 64 | 32 | 3 | — |
|  |  | ⋮ | ⋮ | ⋮ | ⋮ |
| 1 | 100 GB | 0 | 512 | 100 | PRIMARY Vol |
|  |  | ⋮ | ⋮ | ⋮ | ⋮ |
| 2 | 2000 GB | 0 | 2048 | 10 | SUB Vol |
|  |  | ⋮ | ⋮ | ⋮ | ⋮ |
| ⋮ | ⋮ | ⋮ | ⋮ | ⋮ | ⋮ |

FIG. 10

TAPE MANAGEMENT TABLE

1191

| TG 11911 | TG INTRINSIC IDENTIFIER 11912 | Tape 11913 | Keyword 11914 |
|---|---|---|---|
| 0 | AAAAAAAA | 1000, 1001, 1002 | ABCD |
| 1 | BBBBBBBB | 1003, 1004 | EFGH |
| 2 | — (NON-ACQUIRED) | — (NON-ACQUIRED) | — (NON-ACQUIRED) |
| 3 | DDDDDDDD | 1005, 1006, 1007 | OPQR |
| ⋮ | ⋮ | ⋮ | ⋮ |

FIG. 12

PAGE ALLOCATION MANAGEMENT TABLE

| VIRTUAL VOLUME | GROUP ID | VOLUME ATTRIBUTE | ACCESS ATTRIBUTE | REDUNDANCY | OPTIMUM SIZE | Status |
|---|---|---|---|---|---|---|
| 0 | 0 | USER DESIGNATION (Database) | RANDOM | RAID1 | 16 KB | — |
| 1 | 1 | PRIMARY Vol | RANDOM | RAID1 | 256 KB | — |
| 2 | 2 | SUB Vol | SEQUENTIAL | RAID5 | 1 MB | INITIAL COPY |
| 3 | 2 | SUB Vol | SEQUENTIAL | RAID5 | 1 MB | DIFFERENTIAL COPY |
| 4 | 0 | Normal | RANDOM | RAID1 | 16 KB | — |
| 5 | 3 | USER DESIGNATION (Batch Job) | SEQUENTIAL | RAID5 | 512 KB | — |
| ... | | | ... | | | ... |

STORAGE SYSTEM LOGICAL STORAGE AREA ALLOCATING METHOD AND COMPUTER SYSTEM

CROSS REFERENCES TO RELATED APPLICATIONS

This application relates to and claims priority from Japanese Patent Application No. 2008-219547, field on Aug. 28, 2008, the entire disclosure of which is incorporated herein by reference.

BACKGROUND OF THE INVENTION

1. Field of the Invention

The present invention relates to a method of allocating a storage area, and particularly to a method of allocating a logical storage area.

2. Description of the Related Art

As an efficient and effective use method of the resources of a storage area, there is a disk array including plural storage devices. The disk array enhances the reliability by causing the internal storage area to have redundancy, and provides plural hosts with storage areas of required capacity as logical volumes. By this, one storage apparatus can manage the storage areas of plural hosts. Besides, the resources of the storage area can be efficiently and effectively used.

The logical volume includes plural storage areas in page units. The page means the size of a storage area obtained by dividing a storage area of a physical storage device by an arbitrary size. Hereinafter, the storage area in the page unit is simply referred to as the page. The page of the physical storage device having free capacity is allocated as the logical volume of the host, so that the capacity of the logical volume used by the host can be increased.

As a method of providing the logical volume to the host, there is a method in which the capacity of the storage area to be allocated to the host is dynamically changed according to an I/O request from the host, and the logical volume is allocated to the host (see, for example, patent document 1 (JP-A-2003-15915)).

Hitherto, allocation of pages of a logical volume provided to a host for business use is performed so that the pages are allocated so as to be dispersed (at random) in plural physical storage devices. By this, when data is read, since the data is dispersed in the plural physical storage devices, the physical data read time is reduced and the performance of the host for business use becomes high.

SUMMARY OF THE INVENTION

However, in the foregoing method, the logical volume allocated for data backup has a problem as described below. Since a magnetic tape apparatus supports only a sequential access, when backup data stored in the logical volume is written in the magnetic tape apparatus, it is necessary to read the dispersed data in the order of data to be stored. By this, the backup performance is remarkably reduced.

Besides, since the data is dispersed and written in the plural physical storage device, there is a problem that access contention occurs.

The foregoing problem occurs since the arrangement of pages allocated to the logical volume is not considered.

The present invention provides a method for allocating optimum pages to a logical volume according to the usage of the logical volume and an access characteristic.

A typical example of the invention is as follows. That is, a storage system connected to a host computer includes plural disk drives and a controller to control the plural disk drives, the plural disk drives include a first disk drive group including at least one disk drive, and a second disk drive group including the disk drives the number of which is larger than that in the first disk drive group, the host computer is provided with a first logical volume including plural first logical storage areas, information indicating an attribute assigned to the first logical volume is held, and when a first attribute is assigned to the first logical volume, a physical storage area of the first disk drive group is reserved, and when a second attribute is assigned to the first logical volume, a physical storage area of the second disk drive group is reserved, and when a write request is issued from the host computer to the first logical volume, the reserved physical storage area is allocated to a storage area used by the first logical volume, and data requested by the host computer is stored in the allocated physical storage area.

According to the invention, based on the attribute assigned to the logical volume, the logical storage area is allocated as the storage area used by the host computer, and therefore, the logical volume suitable for the usage of the host computer can be provided. Besides, backup performance is also improved.

BRIEF DESCRIPTION OF THE DRAWINGS

FIG. 8 is an explanatory view showing an example of a pool management table of the embodiment of the invention.

FIG. 9 is an explanatory view showing an example of a virtual volume management table of the embodiment of the invention.

FIG. 10 is an explanatory view showing an example of a tape management table of the embodiment of the invention.

FIG. 12 is an explanatory view showing an example of a page allocation management table of the embodiment of the invention.

DETAILED DESCRIPTION OF THE INVENTION

First, the outline of the invention will be described.

Setting relating to a volume is previously performed in a storage apparatus, and when an access request is issued from a host, reference is made to the setting and the access request, and a page reservation process is performed. Specifically, a sequential page reservation process and a random page reservation process are executed. After the page reservation process is ended, pages suitable for the access request are allocated. By this, the optimum pages can be allocated to a logical volume according to the usage of the logical volume and an access characteristic.

Hereinafter, an embodiment of the invention will be described with reference to the drawings.

Figure 1:
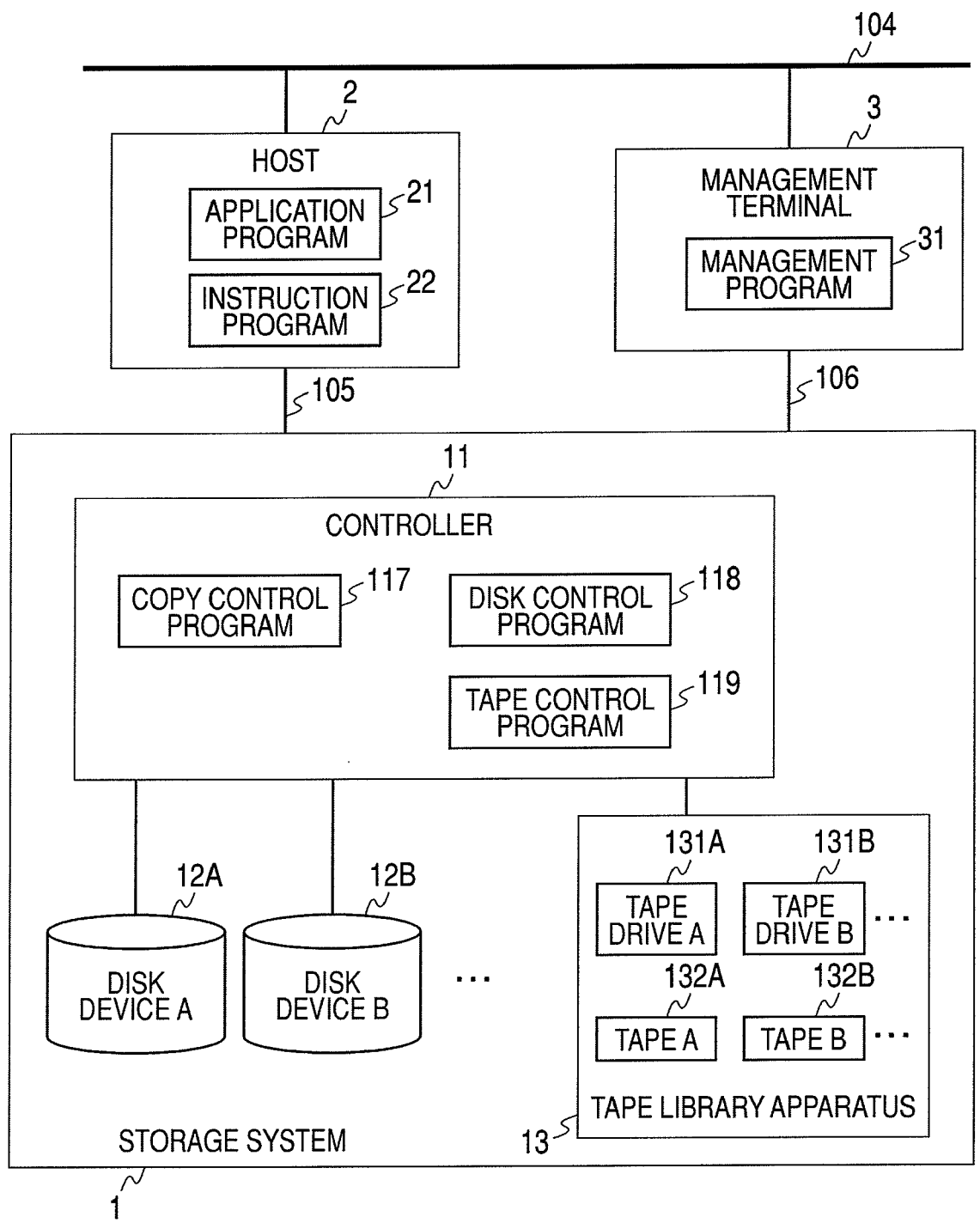
FIG. 1 is a block diagram showing a configuration of a computer system of an embodiment of the invention.

FIG. 1 is a block diagram showing a configuration of a computer system of the embodiment of the invention.

The computer system of the invention includes a storage system 1, a host 2, and a management terminal 3.

The storage system 1 is connected to the host 2 through a network 105, and is connected to the management terminal 3 through a network 106. The host 2 is connected to the management terminal 3 through a network 104. The networks 104 to 106 may be any kinds of networks. For example, the networks 104 and 106 may be IP (Internet Protocol) networks such as LAN (Local Area Network). The network 105 may be the same network as the networks 104 and 106, or may be a so-called storage area network to which an FC (Fibre Channel) protocol is applied.

The host 2 is a computer to provide various services to a user. The host 2 includes a network interface (not shown), a processor (not shown) connected to the network interface, and a memory (not shown) connected to the processor.

The memory of the host 2 stores an application program 21 and an instruction program 22.

The application program 21 is a program executed by the processor in order for the host 2 to provide the services to the user. The processor to execute the application program 21 issues an access request (that is, a data writ request or a data read request) for data in the storage system 1 as the need arises. The instruction program 22 is a program executed by the processor in order for the user to instruct the storage system 1 to back up the data.

Incidentally, the instruction program 22 may be stored in and executed by any device in the computer system. For example, the storage system 1 or the management terminal 3 stores and executes it.

The management terminal 3 is a computer to manage the computer system of the embodiment. The management terminal 3 includes a network interface (not shown), a processor connected to the network interface, and a memory (not shown) connected to the processor.

The memory of the management terminal 3 stores a management program 31. The management program 31 is a program executed by the processor in order to create a logical volume, to manage the storage system 1 and to manage data backup by the storage system 1.

The storage system 1 stores data written by the host 2. The storage system 1 of this embodiment includes a controller 11, at least one disk device 12, and at least one tape library apparatus 13.

The controller 11 holds at least a copy control program 117, a disk control program 118 and a tape control program 119 in order to control the disk device 12 and the tape library apparatus 13. The configuration of the controller 11 will be described later with reference to FIG. 2.

The disk device 12 is a magnetic disk drive, a flash memory or another storage device. The storage system 1 shown in FIG. 1 includes plural disk devices 12, and a disk device 12A or a disk device 12B is one of the plural disk devices 12. The plural disk devices 12 constitute RAID (Redundant Arrays of Inexpensive Disks).

In this embodiment, a logical volume including the plural disk devices 12 is provided to the host 2. The details will be described later with reference to FIG. 3.

The tape library apparatus 13 includes at least one tape drive 131 and at least one tape 132. The tape library apparatus 13 shown in FIG. 1 includes a tape drive 131A, a tape drive 131B, a tape 132A and a tape 132B. The tape drive 131A or the tape drive 131B is one of the plural tape drives 131. The tape 132A or the tape 132B is one of the plural tapes 132. Specifically, each tape corresponds to one tape storage medium.

Figure 2:
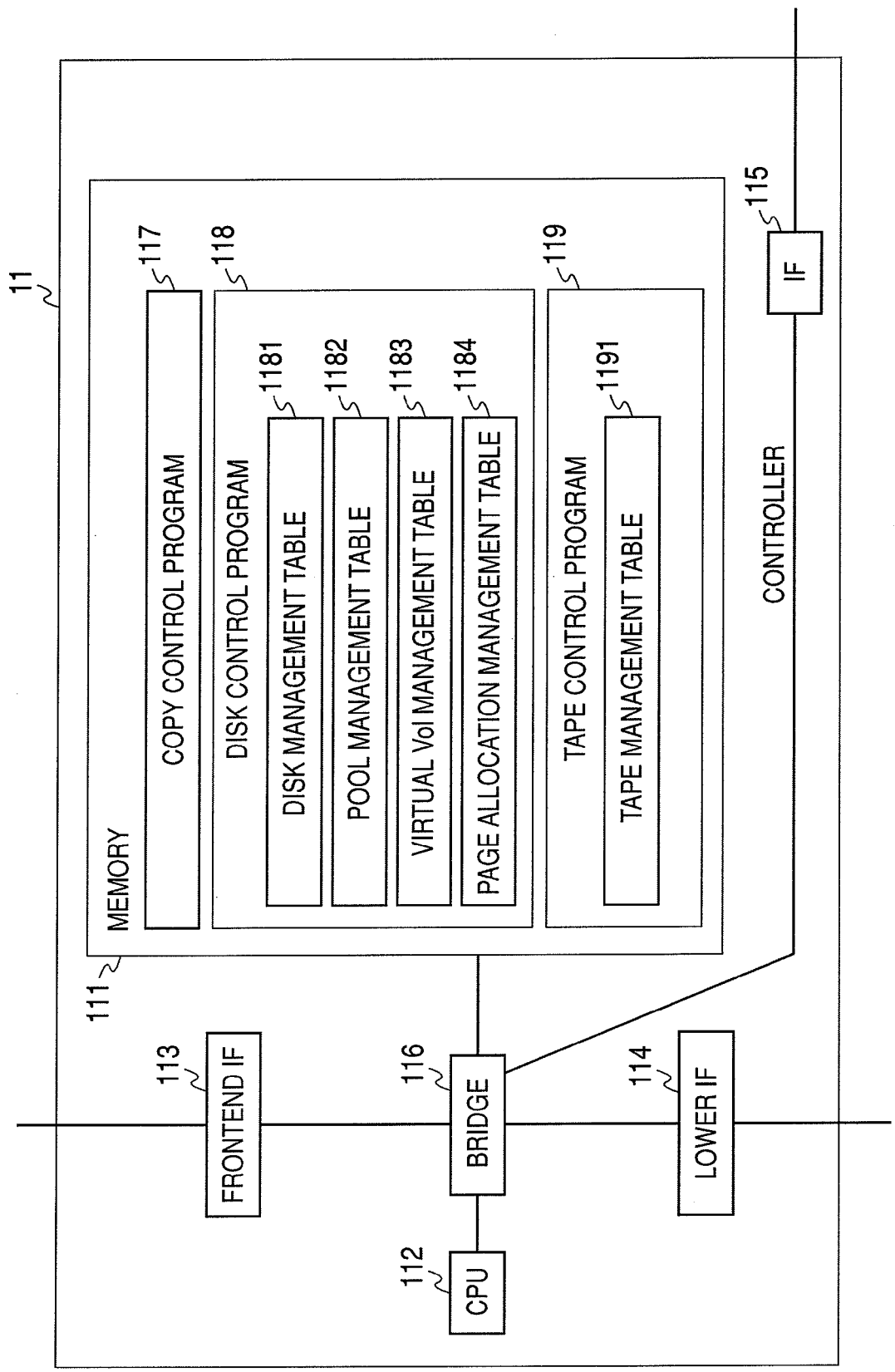
FIG. 2 is a block diagram showing a configuration of a controller of the embodiment of the invention.

FIG. 2 is a block diagram showing the configuration of the controller 11 of the embodiment of the invention.

The controller 11 includes a memory 111, a CPU 112, a frontend interface 113, a backend interface 114, an interface 115, and a bridge 116.

The memory 111 is a data storage device such as, for example, a semiconductor storage device. The memory 111 stores programs to be executed by the CPU 112 and data to be referred by the CPU 112. The memory 111 of this embodiment stores at least the copy control program 117, the disk control program 118 and the tape control program 119.

The copy control program 117 is a program to be executed by the processor in order to control a copy process between the disk device 12 and the tape library apparatus.

The disk control program 118 is a program to be executed by the processor in order to manage the disk device 12, and includes a disk management table 1181, a pool management table 1182, a virtual volume management table 1183 and a page allocation management table 1184. The foregoing tables will be described with reference to FIGS. 6, 8, 9 and 12.

The tape control program 119 is a program to be executed by the processor in order to manage the tape library apparatus 13, and includes a tape management table 1191. The specific contents of the tape management table 1191 will be described later with reference to FIG. 10.

The CPU 112 is the processor to execute the respective programs stored in the memory 111.

The frontend interface 113 is an interface for connecting the controller 11 to the host 2 through the network 105. The backend interface 114 is an interface for connecting the controller 11 to the disk device 12. The backend interface 114 may be, for example, a SCSI adaptor or an FC adaptor.

The interface 115 is an interface for connecting the controller 11 to the management terminal 3 through the network 106. When the network for connecting the controller 11 and the management terminal 3 is a LAN, the interface 115 may be a so-called network interface card.

The bridge 116 connects the memory 111, the CPU 112, the frontend interface 113, the backend interface 114 and the interface 115, and controls communication performed between them.

Figure 3:
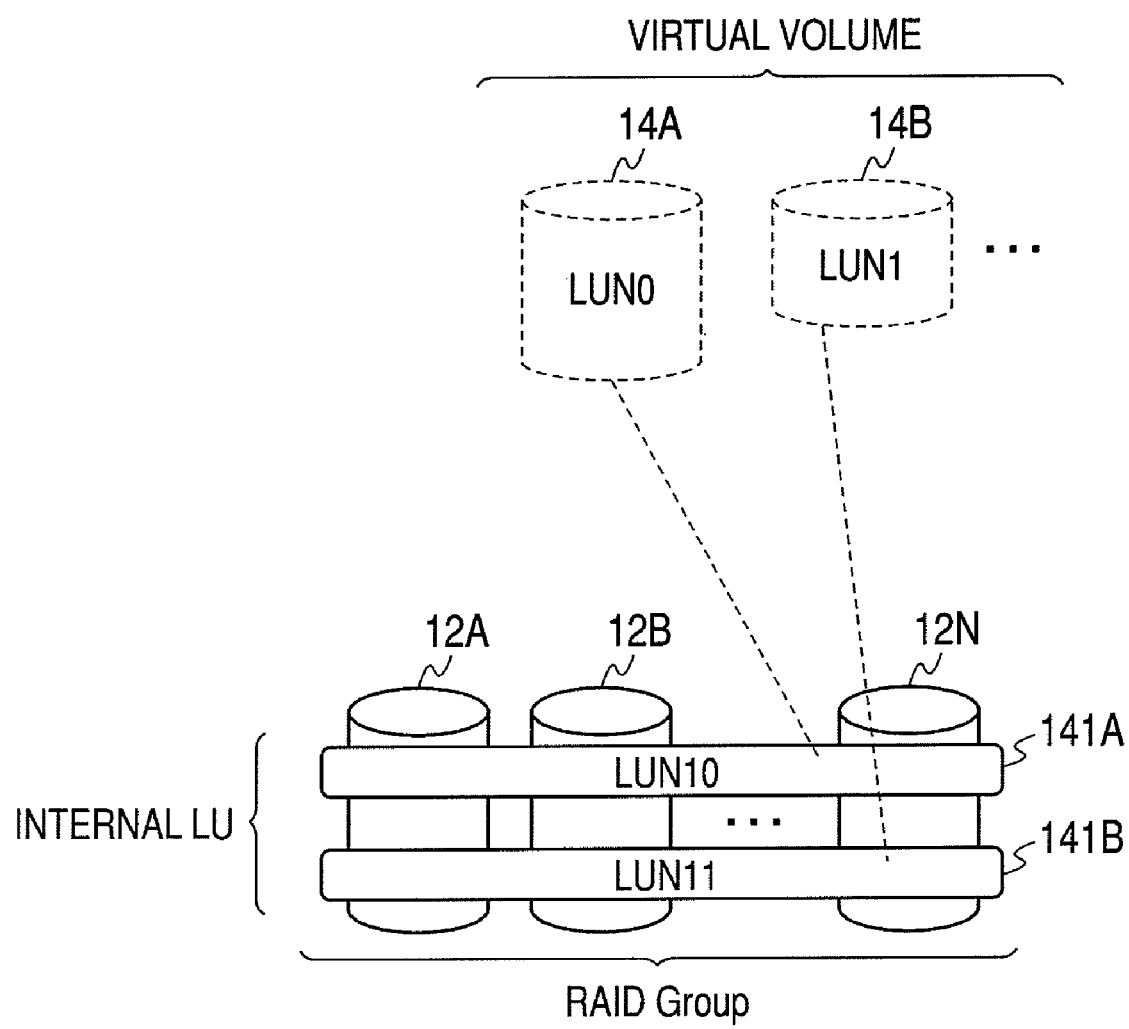
FIG. 3 is an explanatory view of storage areas provided by disk devices of the embodiment of the invention.

FIG. 3 is an explanatory view of a storage area provided by the disk device 12 of the embodiment of the invention.

In the example shown in FIG. 3, the disk devices 12A to 12N constitute one RAID Group. The RAID Group is divided into plural internal LUs (Logical Units) 141 and is managed. In the example shown in FIG. 3, the RAID Group is divided into an internal LU 141A and an internal LU 141B. The internal LU 141 is identified by LUN (Logical Unit Number). Specifically, the internal LU 141A is assigned LUN 10, and the internal LU 141B is assigned LUN 11. The controller 11 can set an arbitrary number of internal LUs 141 each having an arbitrary size.

A virtual volume 14 including the internal LU 141 is the storage area provided to the host 2. The virtual volume 14 may include one internal LU 141 or plural internal LUs 141.

In the example shown in FIG. 3, the internal LU 141A is made to correspond to a virtual volume 14A, and the internal LU 141B is made to correspond to a virtual volume 14B.

The virtual volume 14 is identified by LUN. In FIG. 3, the virtual volume 14A is assigned LUN 0, and the virtual volume 14B is assigned LUN 1. Each of the virtual volumes 14 is recognized as one logical storage area from the host 2.

Figure 4:
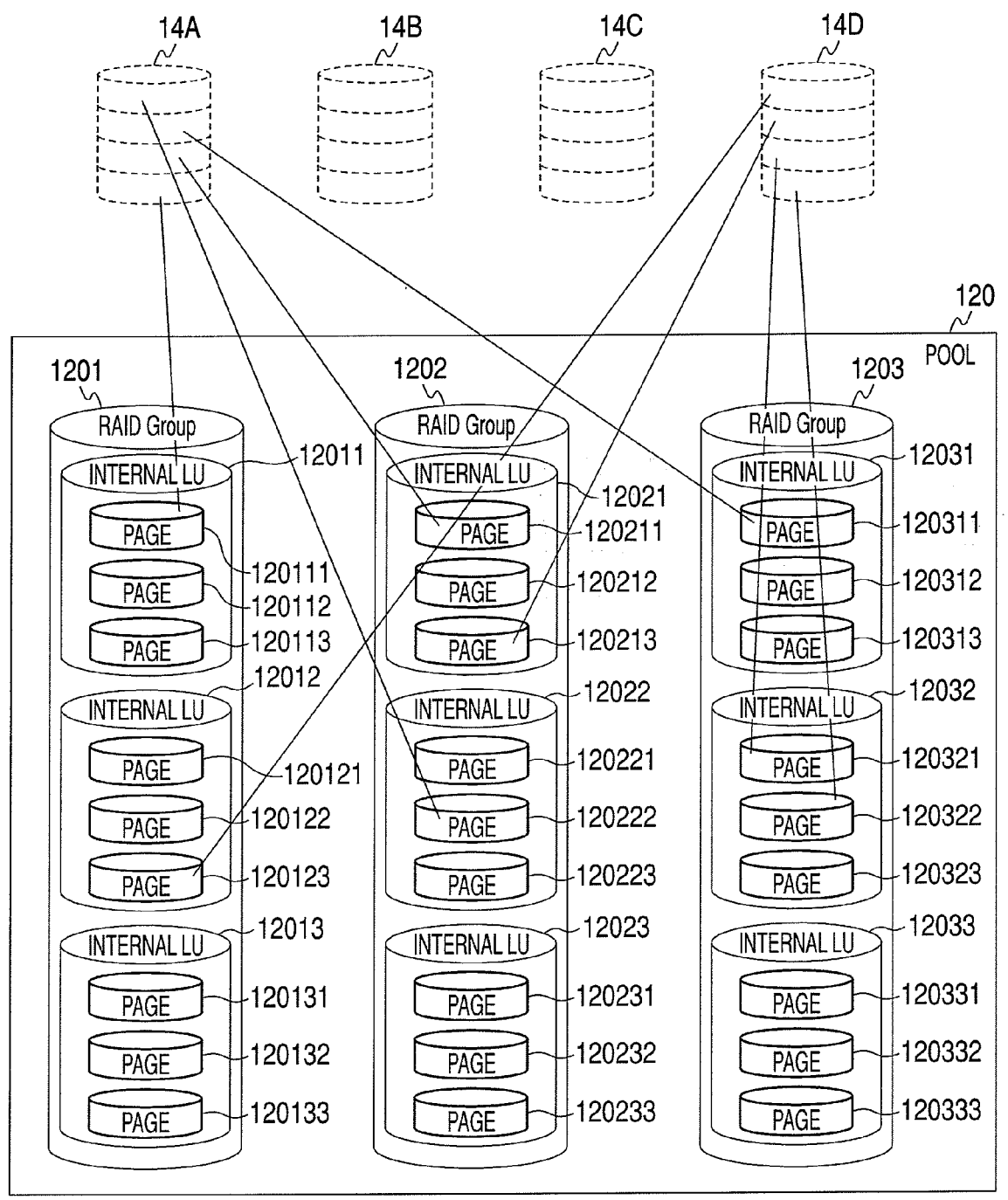
FIG. 4 is an explanatory view for explaining the storage areas provided by the disk devices of the embodiment of the invention.

FIG. 4 is an explanatory view for explaining the storage areas provided by the disk devices 12 of the embodiment of the invention.

The storage system 1 manages the storage areas provided by the plural disk devices 12 in a unit of a pool 120. The storage system 1 may manage the storage areas of all the disk devices 12 in the storage system 1 as one pool 120, or may divide them into plural pools 120 and manage them. In the pool 120, an arbitrary number of RAID Groups can be created. In the example shown in FIG. 4, the pool 120 includes a RAID Group 1201, a RAID Group 1202, and a RAID Group 1203.

Each of the RAID Groups 1201, 1202 and 1203 is divided into an arbitrary number of internal LUs. For example, the RAID Group 1201 is divided into an internal LU 12011, an internal LU 12012 and an internal LU 12013.

As shown in FIG. 4, the internal LU includes plural pages. For example, the internal LU 12011 includes a page 120111, a page 120112 and a page 120113. Here, the page means the size of a storage area obtained by dividing a storage area in an arbitrary size.

The host 2 is provided with the virtual volume 14 as a storage area to be used. As shown in FIG. 4, the virtual volume 14 is created by allocating plural pages. For example, pages 120111, 120211, 120222 and 120311 are allocated to the virtual volume 14A. Besides, pages 120123, 120213, 120321 and 120322 are allocated to the virtual volume 14D. Also with respect to the other virtual volumes 14B and 14C, pages are similarly allocated.

As shown in FIG. 4, since the pages constituting the virtual volume 14 are dispersed in the plural RAID Groups and are allocated, that is, they are allocated at random, the volume is optimum when it is used as the volume for business use, however, it is not suitable when used for backup.

Hitherto, as shown in FIG. 4, the virtual volume 14 including the pages allocated at random is provided to the host 2. However, as stated above, the volume is not suitable as the volume for performing backup. Besides, when setting suitable for the backup is performed, the volume becomes reversely unsuitable as the volume for business use.

According to the invention, page allocation suitable for a usage and an access attribute can be performed by the method described later. That is, the optimum virtual volume 14 can be provided to the host 2.

Figures 5, 6:
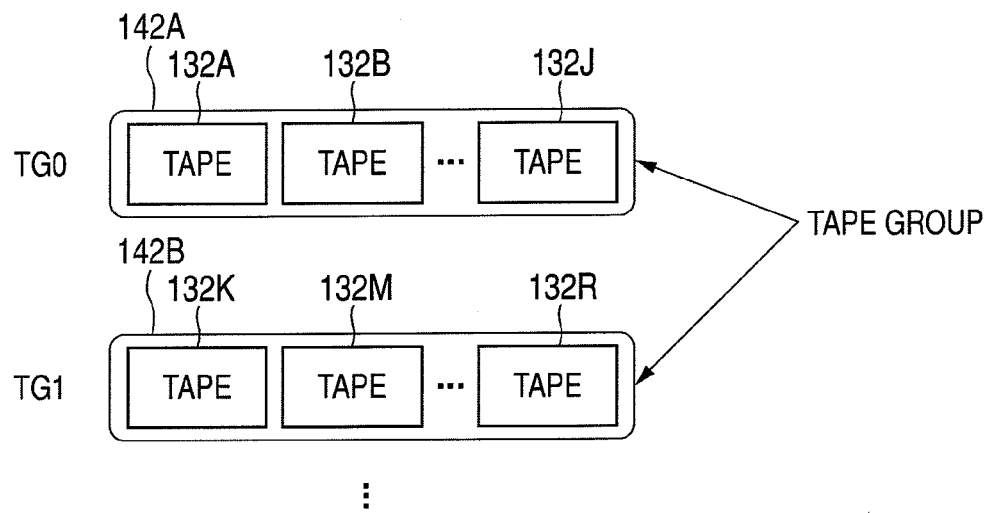
FIG. 5 is a view for explaining management of backup data stored in a tape library apparatus of the invention.
FIG. 6 is an explanatory view showing an example of a disk management table of the embodiment of the invention.

FIG. 5 is a view for explaining management of backup data stored in the tape library apparatus 13 of the invention.

The tape library apparatus 13 stores one piece of backup data in each tape group 142. The tape group 142 includes at least one tape 132. When data to be stored is small, the tape 132 to be used is small, and when data to be stored is large, the tape to be used becomes large.

As shown in FIG. 5, a tape group 142A includes a group of tapes 132 of a tape 132A to a tape 132J. Besides, a tape group 142B includes a group of tapes 132 of a tape 132K to 132R. The tape library apparatus 13 assigns an identification number to each of the tape groups 142, and manages each of the tape groups 142 based on the assigned identification number. Specifically, the tape group 142A is assigned TG0 (see FIG. 10), and the tape group 142B is assigned TG1 (see FIG. 10).

FIG. 6 is an explanatory view showing an example of the disk management table 1181 of the embodiment of the invention.

The disk management table 1181 manages data relating to the configuration of the disk device 12 in the storage system 1, such as an internal LU and a RAID Group.

The disk management table 1181 includes a RAID Group 11811, a RAID LEVEL 11812, a stripe line size 11813, an internal LUN 11814, an LU size 11815, and a physical disk address 11816.

The RAID Group 11811 stores identifiers each specifying a RAID Group including plural disk devices 12.

The RAID LEVEL 11812 stores information indicating the configuration of the RAID.

The stripe line size 11813 stores information indicating the size of a stripe line in an arbitrary RAID Group.

Figure 7:
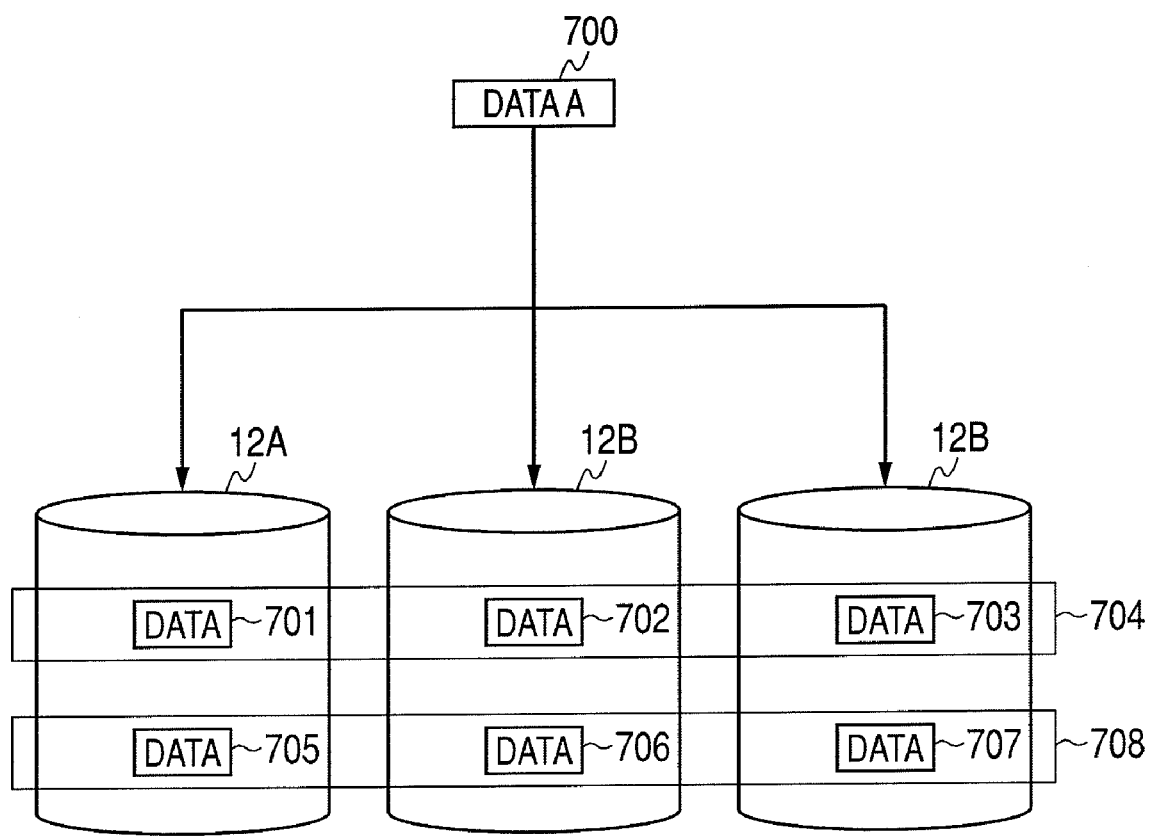
FIG. 7 is an explanatory view for explaining a stripe line of the related art.

FIG. 7 is an explanatory view for explaining the stripe line of the related art.

When data A 700 is written in the disk devices 12A, 12B and 12C, data (stripe) of an arbitrary size is written in each disk device 12. What is obtained by integrating the written data (stripes) in the direction of the respective disk devices 12 is a stripe line. As shown in FIG. 7, data 701, 702, and 703 are integrated into a stripe line 704. Besides, data 705, 706 and 707 are integrated into a stripe line 708. The size of the stripe line 704, 708 is the stripe line size 11813. Incidentally, although the stripe line 704, 708 may include parity, the capacity for the parity is not included in the stripe line size 11813.

Return is made to the explanation of FIG. 6.

The internal LUN 11814 stores an identifier to specify an internal LU.

The LU size 11815 stores information indicating the whole capacity of the internal LU corresponding to the internal LUN 11814.

The physical disk address 11816 stores addresses to specify the positions of physical disks constituting a logical volume.

FIG. 8 is an explanatory view showing an example of the pool management table 1182 of the embodiment of the invention.

The pool management table 1182 manages configuration data relating to the internal LU included in the pool 120.

The pool management table 1182 includes a RAID Group 11821, an internal LUN 11822, a Page Number 11823, a LBA 11824, a Size 11825, a Reserve 11826 and an In-use 11827.

The RAID Group 11821 stores an identifier to specify a RAID Group including plural disk devices 12. The identifier is similar to the identifier of the RAID Group 11811 of the disk management table 1181.

The internal LUN 11822 stores an identifier to specify an internal LU.

The Page Number 11823 stores identifiers to specify pages constituting the internal LU.

The LBA 11824 stores addresses to specify the positions of the pages in the internal LU, especially the start address of each of the pages. For example, a page having the Page Number 11823 of 1 is arranged in blocks of 0 to 31, and a page having the Page Number 11823 of 2 is arranged in blocks of 32 to 63.

The Size 11825 stores information indicating the size of a page.

The Reserve 11826 stores identifiers to specify page reservation (scheduled to use a page) virtual volumes. The stored identifiers include a LUN 11831 (see FIG. 9) and a group ID 11842 (see FIG. 12). Incidentally, the process of page reservation will be described later with reference to FIG. 13.

The In-use 11827 stores information indicating whether a reserved page is actually used. For example, when used, "1" is stored, and when not used, "0" is stored. Alternatively, when used, "0" is stored, and when not used, "1" is stored. Information other than this may be stored.

FIG. 9 is an explanatory view showing an example of the virtual volume management table 1183.

The virtual volume management table 1183 manages the virtual volume 14 to be provided to the host 2 and data relating to allocation of pages.

The virtual volume management table 1183 includes a LUN 11831, a capacity 11832, a LUN LBA 11833, a Size 11834, a Page Number 11835 and a volume attribute 11836.

The LUN 11831 stores an identifier to specify the virtual volume 14.

The capacity 11832 stores information indicating the whole capacity of the virtual volume 14.

The LUN LBA 11833 stores an address to specify the position of the virtual volume 14, especially the start address of the virtual volume 14.

The Size 11834 stores information indicating the size of an allocated page.

The Page Number 11835 stores information indicating which page is allocated to an address corresponding to the LUN LBA 11833. Specifically, the Page Number 11823 of FIG. 8 is stored.

The volume attribute 11836 stores information indicating whether the virtual volume is a primary Vol or a sub Vol. When a copy operation is performed, the primary Vol is a copy source, and the sub Vol is a copy destination.

FIG. 10 is an explanatory view showing an example of the tape management table 1191 of the embodiment of the invention.

The tape management table 1191 manages information relating to the tape 132 of the tape library apparatus 13.

The tape management table 1191 includes a TG 11911, a TG intrinsic identifier 11912, a Tape 11913 and a Keyword 11914.

The TG 11911 stores an identifier to identify and manage the tape group 142 in the storage system 1.

The TG intrinsic identifier 11912 stores an identifier to uniquely specify the tape group 142 in all systems.

The Tape 11913 stores information indicating that the tape group 142 includes which of the tapes 132.

The Keyword 11914 stores a keyword used when the user retrieves the tape group. When the user stores data stored in the disk device 12 into the tape library apparatus 13, he/she can specify the keyword for the tape group 142 of the backup destination. The details will be described later with reference to FIG. 17.

Figure 11:
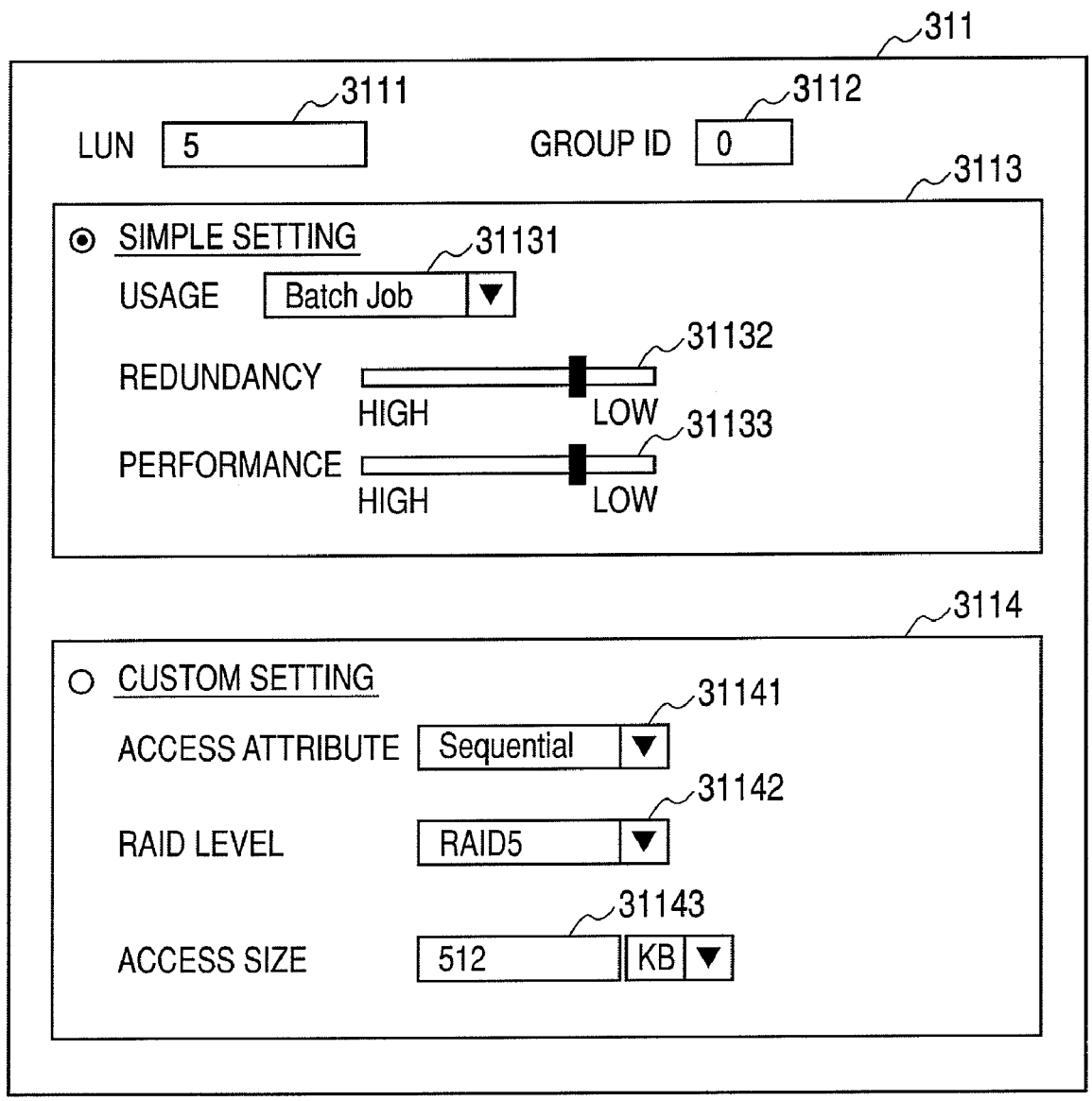
FIG. 11 is an explanatory view showing an example of a user setting screen of the embodiment of the invention.

FIG. 11 is an explanatory view showing an example of a user setting screen 311 of the embodiment of the invention.

The user uses the user setting screen 311 to set information for performing a page allocation process described later.

The user setting screen 311 includes a LUN setting unit 3111, a group ID setting unit 3112, a simple setting unit 3113 and a custom setting unit 3114.

The LUN setting unit 3111 is a setting unit to specify the LUN 11831 of the virtual volume 14.

The group ID setting unit 3112 is a setting unit to specify, when at least one virtual volume 14 is managed as one group, an identifier to specify the group.

The user selects the simple setting unit 3113 or the custom setting unit 3114 and sets the information for performing the page allocation process.

First, the simple setting unit 3113 will be described.

The simple setting unit 3113 includes a usage setting unit 31131, a redundancy setting unit 31132 and a performance setting unit 31133.

The usage setting unit 31131 is a setting unit for selecting the usage of the virtual volume 14 to be used. For example, there is Batch Job or Data Base. The usage setting unit 31131 is set so that the storage system 1 can determine the access attribute from the set usage.

The redundancy setting unit 31132 is a setting unit for selecting that the virtual volume 14 is allocated from a RAID Group of which RAID LEVEL. In the example shown in FIG. 11, although the redundancy setting unit 31132 is a level meter, another selection method may be used. For example, a method may be such that RAID LEVELs are displayed, and one of the RAID LEVELs is selected.

The performance setting unit 31133 is a setting unit to specify the performance required for the virtual volume 14 to be used. For example, when the virtual volume 14 is used for a task with high importance, it is necessary to set the performance to be high. Incidentally, in the example shown in FIG. 11, although the performance setting unit 31133 is the level meter, another selection method may be used. For example, a method may be such that one of high and low is selected.

Next, the custom setting unit 3114 will be described.

The custom setting unit 3114 includes an access attribute setting unit 31141, a RAID LEVEL setting unit 31142 and an access size setting unit 31143.

The access attribute setting unit 31141 is a setting unit for selecting an access attribute to the virtual volume 14 to be used. Specifically, there are two kinds of access attributes, that is, Sequential and Random, and the user specifies one of the attributes.

The RAID LEVEL setting unit 31142 is a setting unit for selecting that an area used in the virtual volume 14 is allocated from a RAID Group of which RAID LEVEL.

The access size setting unit 31143 is a setting unit for setting the size of a page to be allocated.

Incidentally, the setting method of the respective setting units is not limited to the foregoing, and another method may be used.

A setting unit other than the LUN setting unit 3111 and the group ID setting unit 3112 of the user setting screen 311 may not be selected. Besides, only one setting unit is selected and the other setting units may not be selected. When the respective setting units other than the LUN setting unit 3111 and the group ID setting unit 3112 of the user setting screen 311 are not selected, a normal page allocation process is performed. Incidentally, when one of the setting units other than the LUN setting unit 3111 and the group ID setting unit 3112 of the user setting screen 311 is selected, an after-mentioned process is performed in accordance with the selected setting unit.

FIG. 12 is an explanatory view showing an example of the page allocation management table 1184 of the embodiment of the invention.

The page allocation table 1184 stores information selected by the user setting screen 311. The storage system 1 executes an after-described page allocation process in accordance with the page allocation table 1184 (see FIG. 11).

The page allocation table 1184 includes a virtual volume 11841, a group ID 11842, a volume attribute 11843, an access attribute 11844, a redundancy 11845, an optimum size 11846 and a Status 11847.

The virtual volume 11841 stores the information specified by the LUN setting unit 3111.

The group ID 11842 stores the information selected by the group ID setting unit 3112.

The volume attribute 11843 stores the information selected by the usage setting unit 31131, or the information of the volume attribute 11836 of FIG. 9. Besides, when not specified particularly, Normal is stored.

When setting is performed using the custom setting unit 3114, the access attribute 11844 stores the information selected by the access attribute setting unit 31141. Besides, in the case other than that, the access attribute 11844 stores the access attribute determined based on the volume attribute 11843.

For example, when the volume attribute 11843 is the primary Vol or the Data Base, a random access is expected, and therefore, the access attribute 11844 is determined to be random. When the volume attribute 11843 is the sub Vol or Batch Job, a sequential access is expected, and therefore, the access attribute 11844 is determined to be sequential. Besides, when a virtual volume having the same volume attribute already exists, it is expected that the access characteristic is equal to that of the virtual volume, and therefore, the access attribute 11844 of the volume may be determined to be the same access attribute. Besides, the access attribute 11844 can be dynamically corrected and changed.

The redundancy 11845 stores the information selected by the redundancy setting unit 31132 or the RAID LEVEL setting unit 31142.

When setting is performed using the custom setting unit 3114, the optimum size 11846 stores the information selected by the access size setting unit 31143. In the case other than that, the optimum size 11846 stores the optimum size determined based on the information selected by the performance setting unit 31133.

The Status 11847 stores information indicating the state of the virtual volume 14 in which the volume attribute 11843 is the sub Vol. Specifically, the Status 11847 at the sub Vol in the state where the whole of the primary Vol is copied in order to synchronize with the primary Vol is an initial copy. Incidentally, when the copy to the sub Vol is ended, the initial copy is erased from the Status 11847, and the connection between the primary Vol and the sub Vol is released. The Status 11847 at the sub Vol in the state where information required to resynchronize the primary Vol with the sub Vol as the initial copy is copied is a differential copy. When the copy to the sub Vol is ended, the differential copy is erased from the Status 11847, and the connection between the primary Vol and the sub Vol is released.

Figure 13:
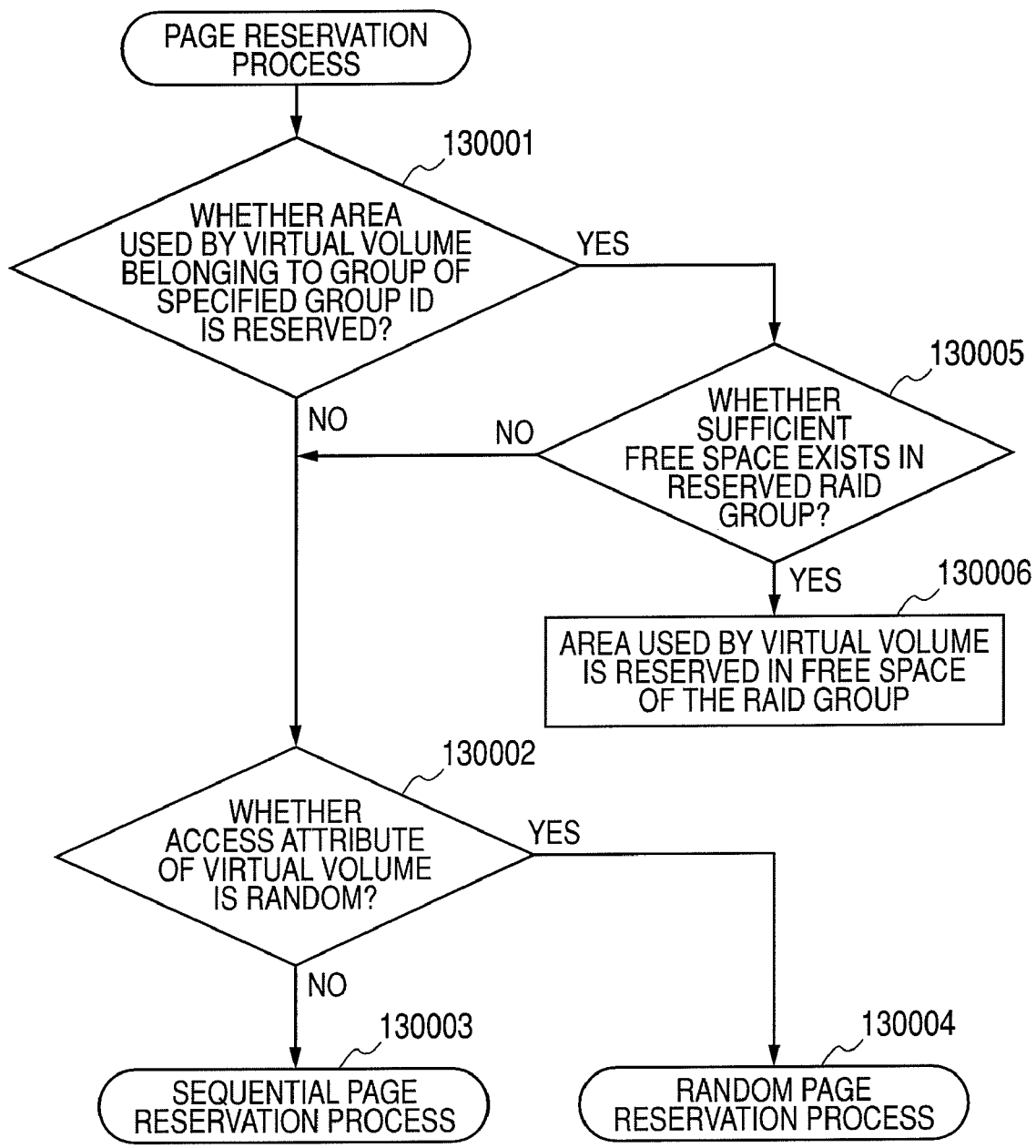
FIG. 13 is a flowchart for explaining a page reservation process of the embodiment of the invention.

FIG. 13 is a flowchart for explaining a page reservation process in the embodiment of the invention.

The page reservation process is executed when the virtual volume 14 is created. Specifically, in order to create the virtual volume 14 specified by the LUN setting unit 3111 in the group specified by the group ID setting unit 3112, the disk control program 118 executes a process described below.

The disk control program 118 determines whether the area used by the virtual volume belonging to the group specified by the group ID setting unit 3112 is reserved (130001). Specifically, the disk control program 118 refers to the group ID 11842 of the page allocation management table 1184, and determines whether the pertinent group ID 11842 exists in the Reserve 11826 of the pool management table 1182.

When it is determined that the area used by the virtual volume 14 belonging to the group specified by the group ID setting unit 3112 is not reserved, the disk control program 118 refers to the access attribute 11844 of the virtual volume 14, and determines whether the access attribute of the virtual volume 14 is random (130002).

When it is determined that the access attribute of the virtual volume 14 is not random, the disk control program 118 executes a sequential page reservation process (130003). The specific process will be described later with reference to FIG. 15.

When it is determined that the access attribute of the virtual volume 14 is random, the disk control program 118 executes a random page reservation process (130004). The specific process will be described later with reference to FIG. 14.

At step 130001, when the area used by the virtual volume 14 belonging to the group specified by the group ID setting unit 3112 is reserved, the disk control program 118 refers to the In-use 11827 of the pool management table 1182, and determines whether sufficient free space exists in the reserved RAID Group (130005). For example, the determination is performed based on whether the free space is less than 10% of the whole area of the RAID Group.

When it is determined that the sufficient free space exists in the reserved RAID Group, the disk control program 118 reserves an area used by the virtual volume 14 in the free space of the RAID Group (130006).

When it is determined that the sufficient free space does not exist in the reserved RAID Group, the disk control program 118 advances to step 130002.

When the access attribute 11844 is not set, at step 13002, the disk control program 118 advances to step 13004. That is, the random page reservation process is executed.

When the system is constructed first, at step 13001, advance is made to step 13002 without fail. By this, the sequential page reservation and the random page reservation can be performed from the beginning of the construction of the system. Besides, also when the virtual volume is formed newly, page reservation corresponding to the access attribute can be performed.

Figure 14:
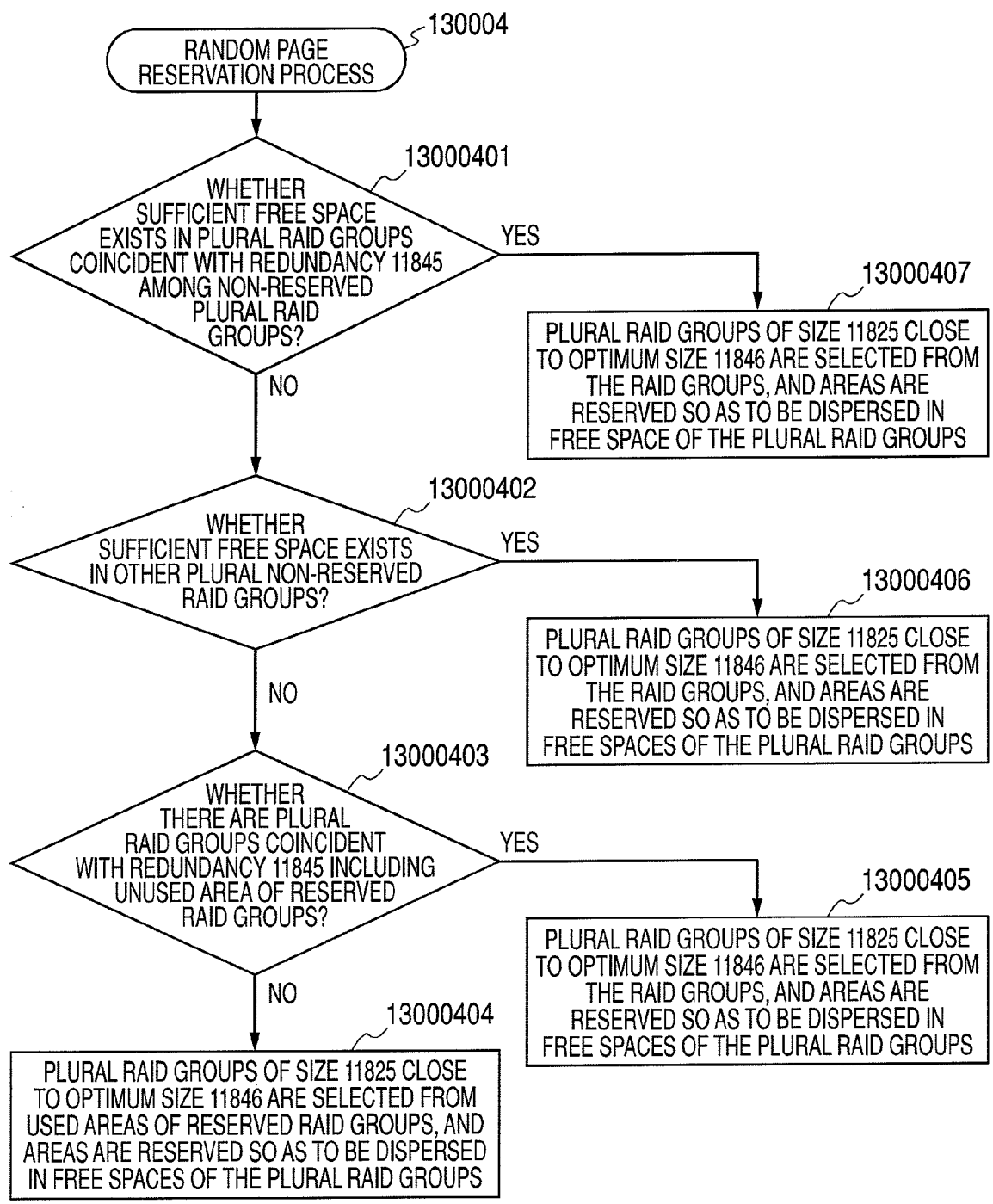
FIG. 14 is a flowchart for explaining a random page reservation process of the embodiment of the invention.

FIG. 14 is a flowchart for explaining the random page reservation process in the embodiment of the invention.

The disk control program 118 determines whether sufficient free space exists in plural RAID Groups coincident with the redundancy 11845 among plural unreserved RAID Groups (13000401). Specifically, the disk control program 118 refers to the redundancy 11845, and retrieves the RAID Group corresponding to the RAID LEVEL 11812 of the disk management table 1181 (procedure 1). Next, the disk management program 118 refers to the In-use 11827 (see FIG. 8) corresponding to the pertinent RAID Group, and determines whether sufficient free space exists (procedure 2). The determination method of the free space may be the same method as step 13005.

When it is determined that the sufficient free space exists in the plural RAID Groups coincident with the redundancy 11845, the disk control program 118 refers to the Size 11825 (see FIG. 8) of the plural RAID Groups coincident with the redundancy 11845 and the optimum size 11846 (FIG. 12), selects plural RAID Groups of the Size 11825 close to the optimum size 11846, and reserves areas used by the virtual volume 14 so as to be dispersed in the free spaces of the plural selected RAID Groups (13000407).

When it is determined that the sufficient free space does not exist in the plural RAID Groups coincident with the specified redundancy 11845, that is, when the procedure 1 and the procedure 2 are not satisfied, the disk control program 118 determines whether sufficient free space exists in unreserved areas of RAID Groups of a RAID LEVEL different from the redundancy 11845 (13000402). The determination method of the free space may be the same method as step 13005.

When it is determined that the sufficient free space exists in the unreserved areas of the RAID Groups of the RAID LEVEL different from the specified redundancy 11845, the disk control program 118 refers to the Size 11825 (see FIG. 8) of the plural RAID Groups and the optimum size 11846 (FIG. 12), selects plural RAID Groups of the Size 11825 close to the optimum size 11846 from the RAID Groups satisfying step 1300402, and reserves the areas used by the virtual volume 14 so as to be dispersed in the free spaces of the plural selected RAID Groups (13000406).

When it is determined that the sufficient free space does not exist in the unreserved areas of the RAID Groups of the RAID LEVEL different from the specified redundancy 11845, the disk control program 118 determines whether there are plural RAID Groups coincident with the redundancy 11845, including the unused area of the reserved RAID Group (13000403).

When it is determined that there are no plural RAID Groups coincident with the redundancy 11845, including the unused area of the reserved RAID Group, the disk control program 118 selects plural RAID Groups of the Size 11825 close to the optimum size 11846 from the areas used by the reserved RAID Groups, and reserves the areas used by the virtual volume 14 so as to be dispersed in the free spaces of the plural selected RAID Groups (13000404).

When it is determined that there are plural RAID Groups coincident with the redundancy 11845, including the unused area of the reserved RAID Group, the disk control program 118 refers to the Size 11825 (see FIG. 8) of the plural pertinent RAID Groups and the optimum size 11846 (FIG. 12), selects plural RAID Groups of the Size 11825 close to the optimum size 11846, and reserves the areas used by the virtual volume 14 so as to be dispersed in the free spaces of the plural selected RAID Groups (13000405).

When the access attribute 11844 is not set, the disk control program 118 advances to step 1300402 at step 13000401, and advances to step 1300404 at step 1300403. When the optimum size 11846 is not set, the disk control program 118 reserves the areas so as to be dispersed in the free spaces of the pertinent RAID Groups without considering the Size 11825 at step 1300404, step 1300405, step 1300406 and step 1300407. That is, the areas used by the virtual volume 14 are reserved so as to be dispersed in the free spaces of the plural RAID Groups different in Size 11825.

In the random page reservation process, when there are plural RAID Groups satisfying a specified condition, the areas used by the virtual volume 14 are reserved so as to be dispersed in the plural RAID Groups, and therefore, the volume optimum for a task in which a random access is performed can be allocated.

Figure 15:
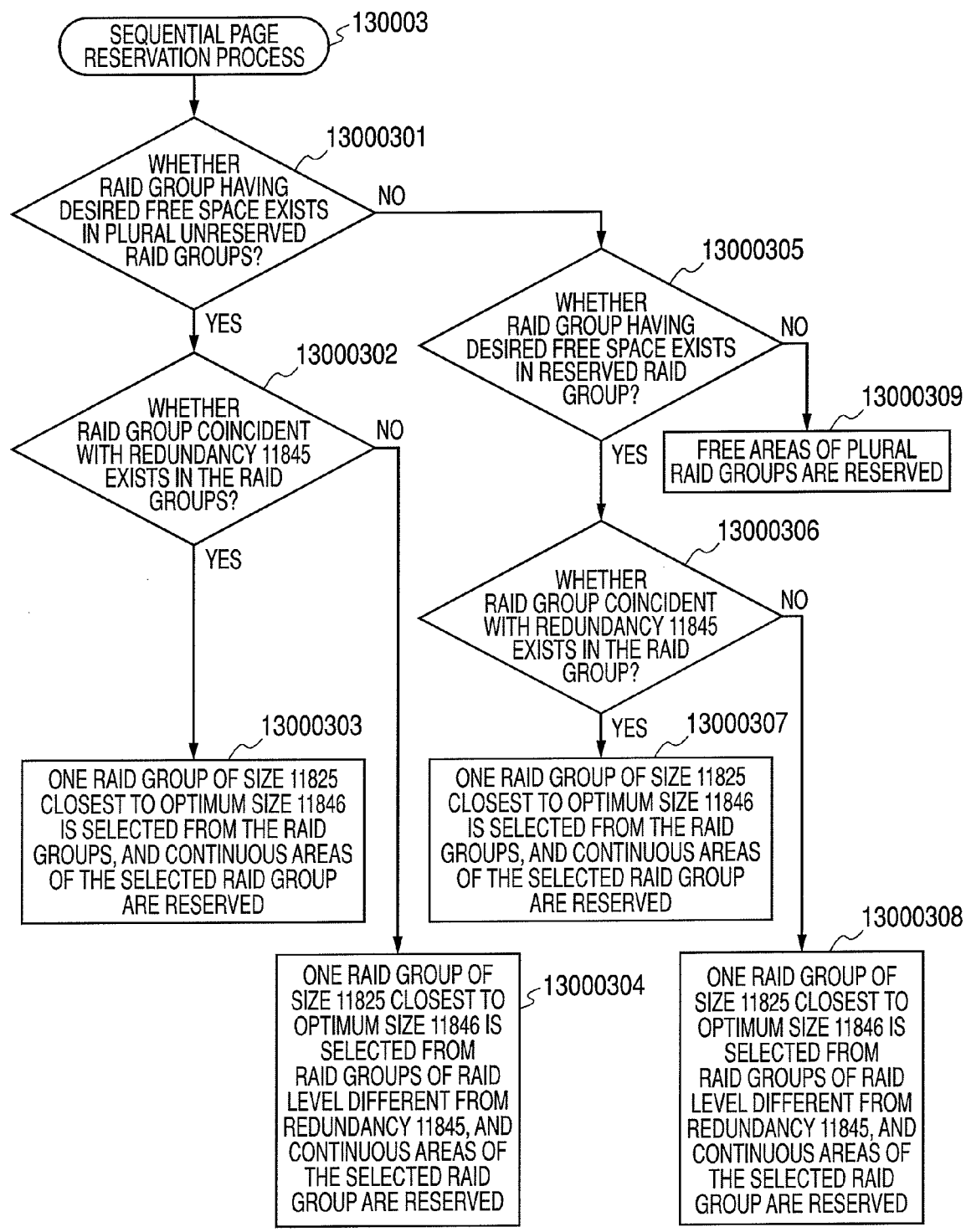
FIG. 15 is a flowchart for explaining a sequential page reservation process of the embodiment of the invention.

FIG. 15 is a flowchart for explaining the sequential page reservation process in the embodiment of the invention.

The disk control program 118 determines whether a RAID Group having a desired free space exists in plural unreserved RAID Groups (13000301). Specifically, the disk control program 118 determines whether a RAID Group having an area larger than the area of the virtual volume 14 to be created exists in the plural unreserved RAID Groups. The number of the relevant RAID Groups is not necessarily one, but can be plural.

When it is determined that the RAID Groups satisfying step 13000301 exist, the disk control program 118 determines whether the RAID Group of the RAID LEVEL coincident with the redundancy 11845 exists in the RAID Groups satisfying step 13000301 (13000302).

When it is determined that the RAID Group of the RAID LEVEL coincident with the redundancy 11845 exists in the RAID Groups satisfying step 13000301, the disk control program 118 selects one RAID Group of the Size 11825 closest to the optimum size 11846 from the RAID Groups satisfying step 13000302, and reserves the areas used by the virtual volume 14 in the continuous areas of the selected RAID Group (13000303).

Specifically, reservation is made so that the Page Number 11823 of the RAID Group satisfying step 13000302 becomes continuous. For example, the reservation is continuously made so that the Page Number 11823 becomes "1, 2, 3". When the Page Number 11823 is "1, 3, 4", it is not continuous.

When it is determined that the RAID Group of the RAID LEVEL coincident with the redundancy 11845 does not exist in the RAID Groups satisfying step 13000301, the disk control program 118 selects one RAID Group of the Size 11825 closest to the optimum size 11846 from the RAID Groups satisfying step 13000301, and reserves the areas used by the virtual volume 14 in the continuous areas of the selectedRAID Group (13000304). However, as the selected RAID Group, one having a large free space is selected with priority.

At step 13000301, when it is determined that there is no RAID Group satisfying step 13000301, the disk control program 118 determines whether a RAID Group having a desired free space exists in reserved RAID Groups (13000305).

When it is determined that there is no RAID Group satisfying step 13000305, the disk control program 118 reserves the area used by the virtual volume 14 in the free spaces of the plural RAID Groups (1300309).

When it is determined that there are RAID Groups satisfying step 13000305, the disk control program 118 determines whether the RAID Group of the RAID LEVEL coincident with the redundancy 11845 exists in the RAID Groups satisfying step 13000305 (1300306).

When it is determined that there are RAID Groups satisfying step 13000306, the disk control program 118 selects one RAID Group of the Size 11825 closest to the optimum size 11846 from the RAID Groups satisfying step 13000306, and reserves the areas used by the virtual volume 14 in the continuous areas of the selected RAID Group (13000307).

When it is determined that there is no RAID Group satisfying step 13000306, the disk control program 118 selects one RAID Group of the Size 11825 closest to the optimum size 11846 from RAID Groups of RAID LEVEL different from the redundancy 11845, and reserves the areas used by the virtual volume 14 in the continuous areas of the selected RAID Group (13000308). However, as the selected RAID Group, one having a large free space is selected with priority.

When the redundancy 11845 is not set, the disk control program 118 advances to step 13000304 at step 13000302, and advances to step 1300038 at step 13000306. When the optimum size 11846 is not set, the disk control program 118 reserves the areas used by the virtual volume 14 continuously from the relevant RAID Group without considering the Size 11825 at step 13000303, step 13000304, step 13000307 and step 13000308.

Figure 16:
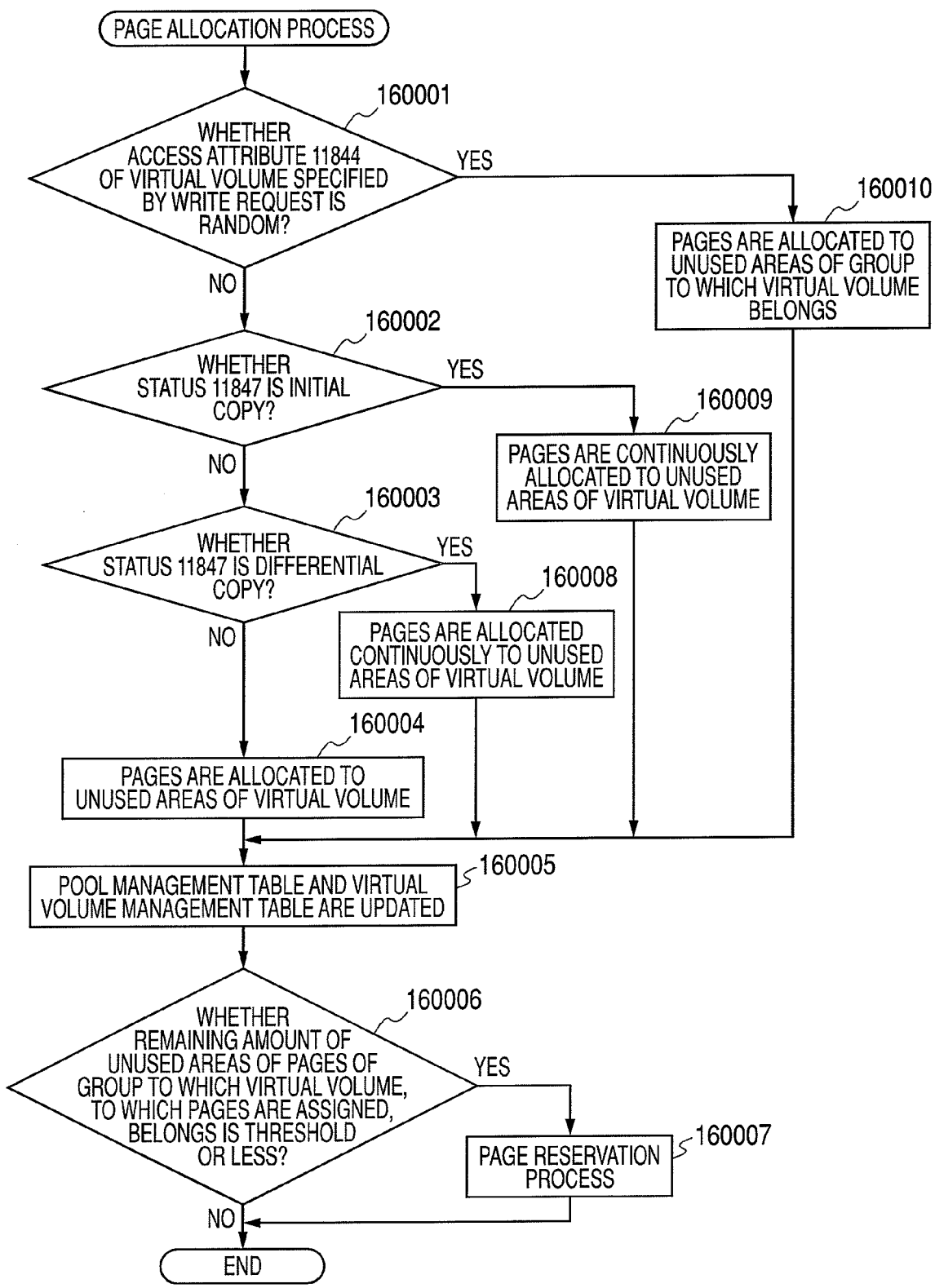
FIG. 16 is a flowchart for explaining a page allocation process of the embodiment of the invention.

FIG. 16 is a flowchart for explaining a page allocation process in the embodiment of the invention.

The page allocation process is executed when a data write request is issued from the host 2. The write request includes at least an identifier to specify the virtual volume 14 in which data is written. The identifier is, for example, the virtual volume 11841 or the group ID 11842.

The disk control program 118 determines whether the access attribute 11844 of the virtual volume 14 specified by the write request is random (160001).

When it is determined that the access attribute 11844 of the virtual volume 14 specified by the write request is random, the disk control program 118 allocates pages used by the virtual volume 14 specified by the write request to the unused areas of the group to which the virtual volume 14 having the random access attribute 11844 belongs (160010). Specifically, the pages are allocated so as to be dispersed in the plural internal LUs 141. The disk control program 118 allocates the pages and then advances to step 160005.

When it is determined that the access attribute 11844 of the virtual volume 14 specified by the write request is not the random access, the disk control program 118 determines whether the Status 11847 of the virtual volume 14 specified by the write request is the initial copy (160002).

When it is determined that the Status 11847 of the virtual volume 14 specified by the write request is the initial copy, the disk control program 118 continuously allocates the pages used by the virtual volume 14 specified by the write request to the unused areas of the virtual volume 14 in which the access attribute 11844 is sequential (160009). However, in the data of the initial copy, since data is arranged in the order of reading, the disk control program 118 allocates the pages in the order of the LUN LBA 11833. For example, in the example shown in FIG. 9, the page of the Page Number 11835 "1" is allocated to the LUN LBA 11833 of "0", and the page of the Page Number 11835 "2" is allocated to the LUN LBA 11833 of "32". Specifically, the pages are continuously allocated in one internal LU 141. After the pages are allocated, the disk control program 118 advances to step 160005.

When it is determined that the Status 11847 of the virtual volume 14 specified by the write request is not the initial copy, the disk control program 118 determines whether the Status 11847 of the virtual volume 14 specified by the write request is the differential copy (160003).

When it is determined that the Status 11847 of the virtual volume 14 specified by the write request is the differential copy, the disk control program 118 continuously allocates the pages used by the virtual volume 14 specified by the write request to the unused areas of the virtual volume 14 in which the access attribute 11844 is sequential (160008). However, in the differential data, individual data are arranged in the order of addresses, and accordingly, the disk control program 118 appoints pages of small LBA 11824 in the order of addresses of the differential data. Specifically, the pages are continuously allocated to one internal LU.

When it is determined that the Status 11847 of the virtual volume 14 specified by the write request is not the differential copy, the disk control program 118 allocates the pages used by the virtual volume 14 specified by the write request to the unused areas of the virtual volume 14 in which the access attribute 11844 is sequential (160004).

Next, the disk control program 118 updates the pool management table 1182 and the virtual volume management table 1183 (160005), and determines whether the remaining amount of the unused areas of pages of the group to which the virtual volume 14, to which the pages are allocated, belongs is a threshold or less (160006). Incidentally, the threshold is set arbitrarily. For example, the threshold of the remaining amount can be set to 50 GB.

When it is determined that the remaining amount of the unused areas of the pages of the group to which the virtual volume 14, to which the pages are allocated, belongs is larger than the threshold, the disk control program 118 ends the page allocation process.

When it is determined that the remaining amount of the unused areas of the pages of the group to which the virtual volume 14, to which the pages are allocated, belongs is the threshold or less, the disk control program 118 executes a page reservation process (160007). The page reservation process is the same process as FIG. 13. After the page reservation process, the disk control program 118 ends the page allocation process.

According to the page allocation process, for example, when data of the initial copy is stored in the tape library apparatus 13, since the data of the initial copy is continuously written by step 160010, the data of the initial copy can be stored in the tape library apparatus 13 without reducing the read performance.

Next, a process of performing backup to the tape library apparatus 13 will be described.

Figure 17:
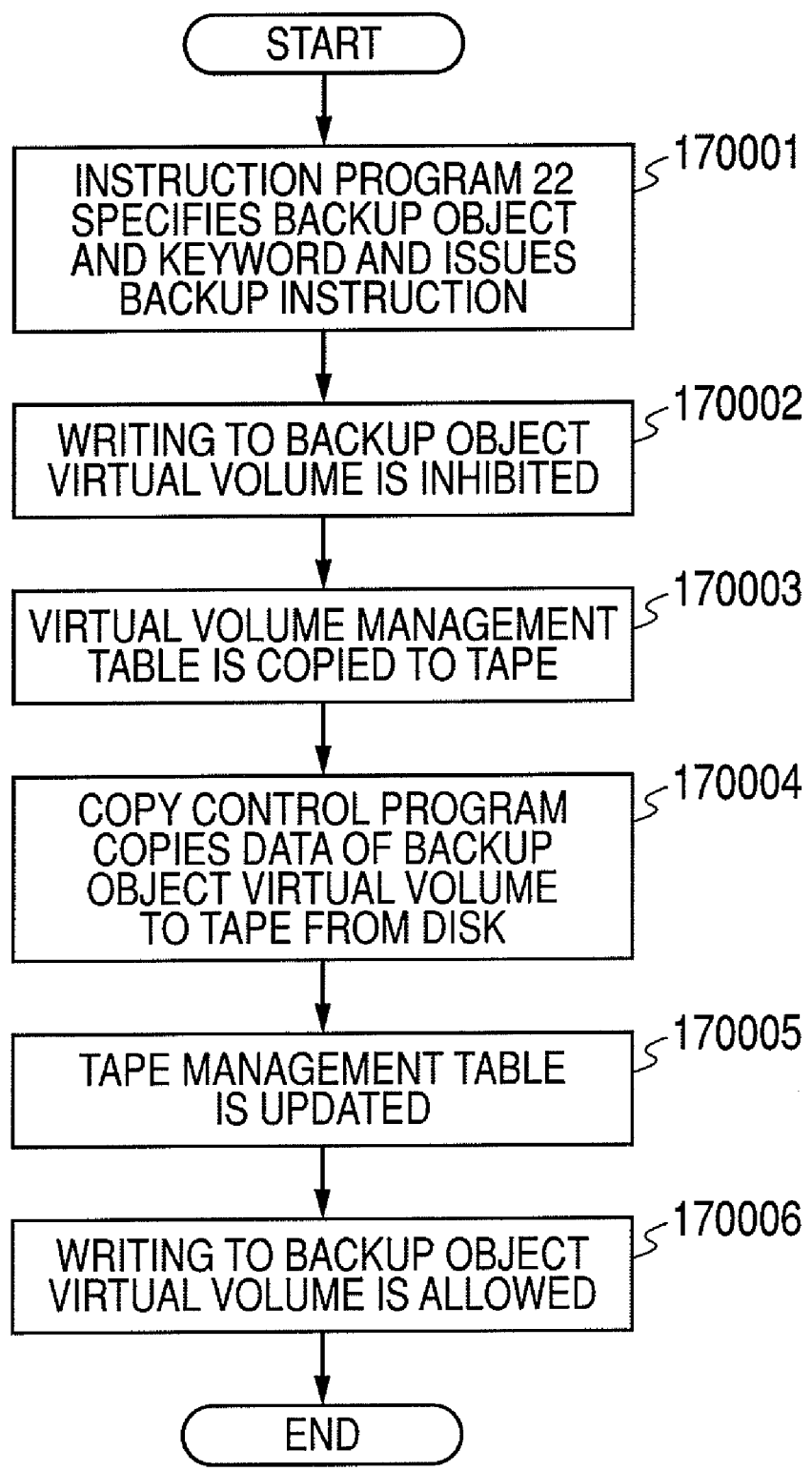
FIG. 17 is a flowchart for explaining a backup process to a tape library apparatus of the related art.

FIG. 17 is a flowchart for explaining a backup process to the tape library apparatus 13 of the related art.

The backup process is executed after receiving an instruction from the host 2 or the management terminal 3.

The instruction program 22 specifies the virtual volume 14 of a backup object and a Keyword, and issues the instruction of the backup (170001). The issued instruction is transmitted to the storage system 1.

The copy control program 117 of the storage system 1 receiving the instruction inhibits writing to the virtual volume 14 of the backup object (170002). Specifically, writing to the internal LU allocated to the virtual volume 14 is inhibited.

Next, the copy control program 117 copies the virtual volume management table 1183 to the tape 132 of the tape library apparatus 13 (170003).

The copy control program 117 copies the data of the virtual volume 14 of the backup object stored in the disk device 12 to the tape 132 of the tape library apparatus 13 (170004), and updates the tape management table after the copy is ended (170005). Specifically, the TG intrinsic identifier 11912, the Tape 11913 and the Keyword 11914 are updated.

The copy control program 117 allows writing to the virtual volume 14 of the backup object (170006), and ends the process.

Figure 18:
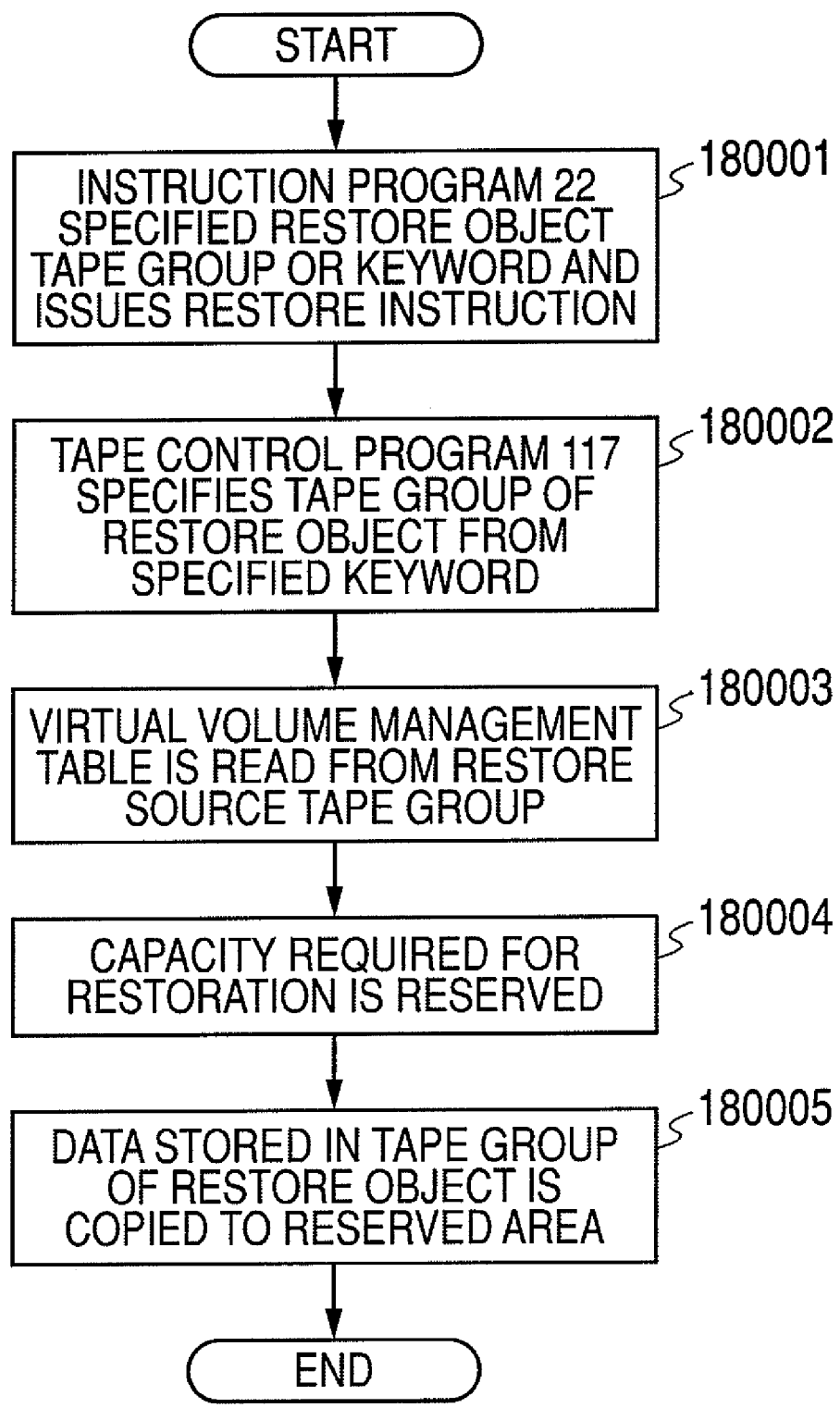
FIG. 18 is a flowchart for explaining a restore process from a tape library apparatus.

FIG. 18 is a flowchart for explaining a restore process from the tape library apparatus 13.

The restore process is executed after an instruction from the host 2 or the management terminal 3 is received.

The instruction program 22 specifies a tape group of a restore object or a Keyword and issues the restore instruction (180001). The issued instruction is transmitted to the storage system 1.

When the Keyword is specified, the tape control program 119 of the storage system 1 receiving the instruction specifies the tape group of the restore object from the Keyword (180002).

The tape control program 119 reads the virtual volume management table 1183 from the specified tape group (180003).

The tape control program 119 requests the disk control program 118 to perform the page reservation process in order to secure an area required for restoring (180004).

The tape control program 119 copies data stored in the tape group of the restore object to the reserved area (180005).

Figure 19:
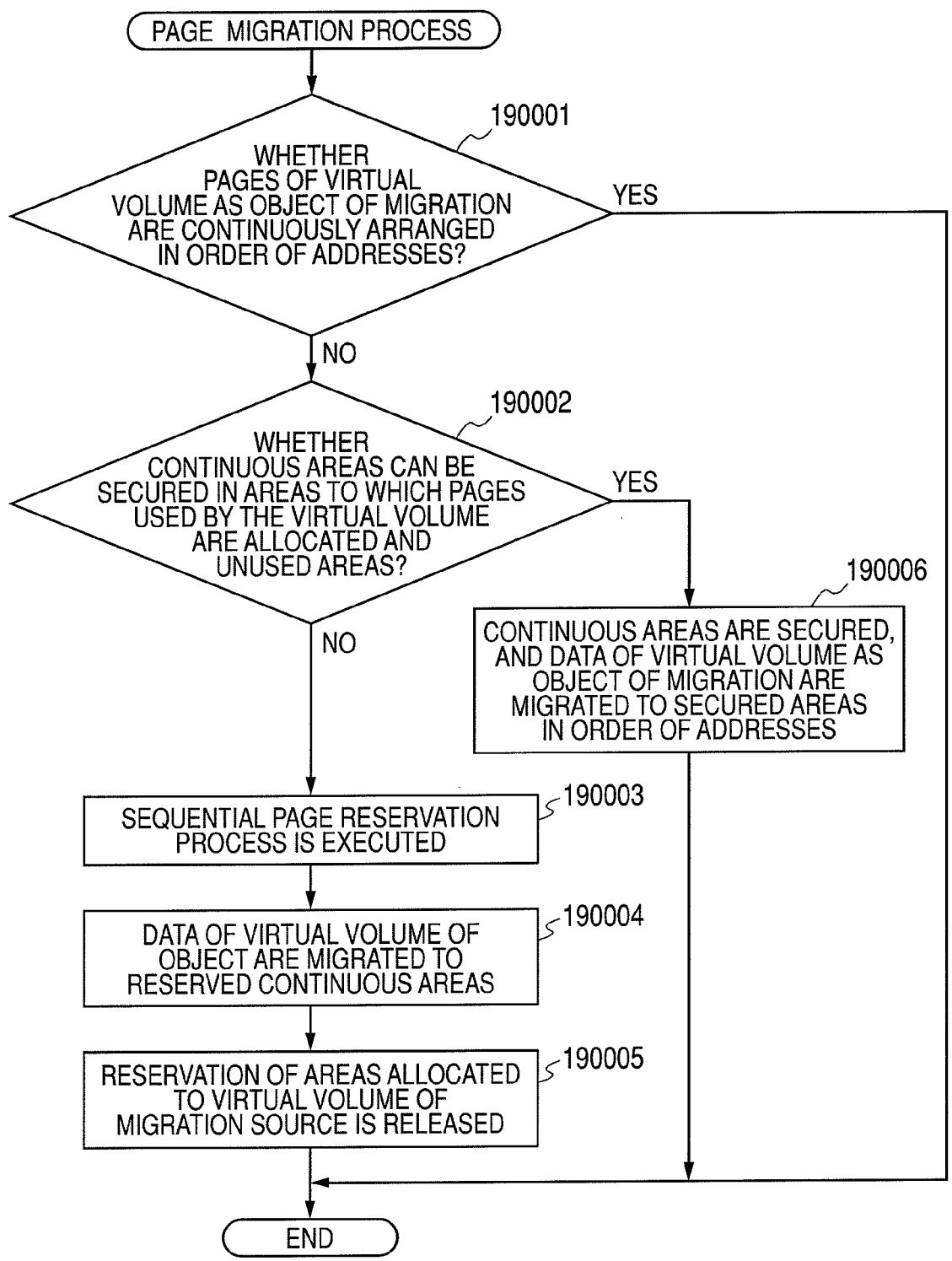
FIG. 19 is a flowchart for explaining a page migration process of the embodiment of the invention.

FIG. 19 is a flowchart for explaining a page migration process in the embodiment of the invention.

The page migration process is executed after the backup process is completed. For example, after the data in which the volume attribute 11836 is stored in the virtual volume 14 of the sub Vol is written in the tape, the page migration process is executed. Alternatively, another virtual volume 14 is deleted, and when the page used or reserved by the deleted volume is opened, the page migration process is executed.

First, the disk control program 118 determines whether the pages of the virtual volume 14 as the object of the migration are continuously arranged in the order of addresses (190001). Specifically, the disk control program 118 refers to the Page Number 11835 of the virtual volume management table 1183, and determines whether the Page Number 11835 is continuous in the order of addresses.

When it is determined that the pages of the virtual volume 14 as the object of the migration are arranged continuously in the order of addresses, the disk control program 118 ends the process.

When it is determined that the pages of the virtual volume 14 as the object of the migration are not arranged continuously in the order of addresses, the disk control program 118 determines whether continuous areas can be secured in the areas to which the pages used by the virtual volume 14 are allocated and the unused areas (190002).

When it is determined that the continuous areas can be secured, the disk control program 118 secures the continuous areas, and migrates the data of the virtual volume 14 as the object of the migration to the secured areas in the order of addresses (190006).

When it is determined that the continuous areas can not be secured, the disk control program 118 executes the sequential page reservation process 130003 (190003). The sequential page reservation process 130003 is the same process as FIG. 15.

Next, the disk control program 118 migrates the data of the virtual volume 14 as the object of the migration to the continuous areas reserved by the sequential page reservation process (190004).

After the migration is ended, the disk control program 118 releases the reservation of the areas allocated to the virtual volume of the movement source (190005).

By the foregoing process, since the data of the virtual volume 14 of the migration destination are arranged in the order of addresses, the virtual volume 14 is suitable for the sequential access.

Figure 20:
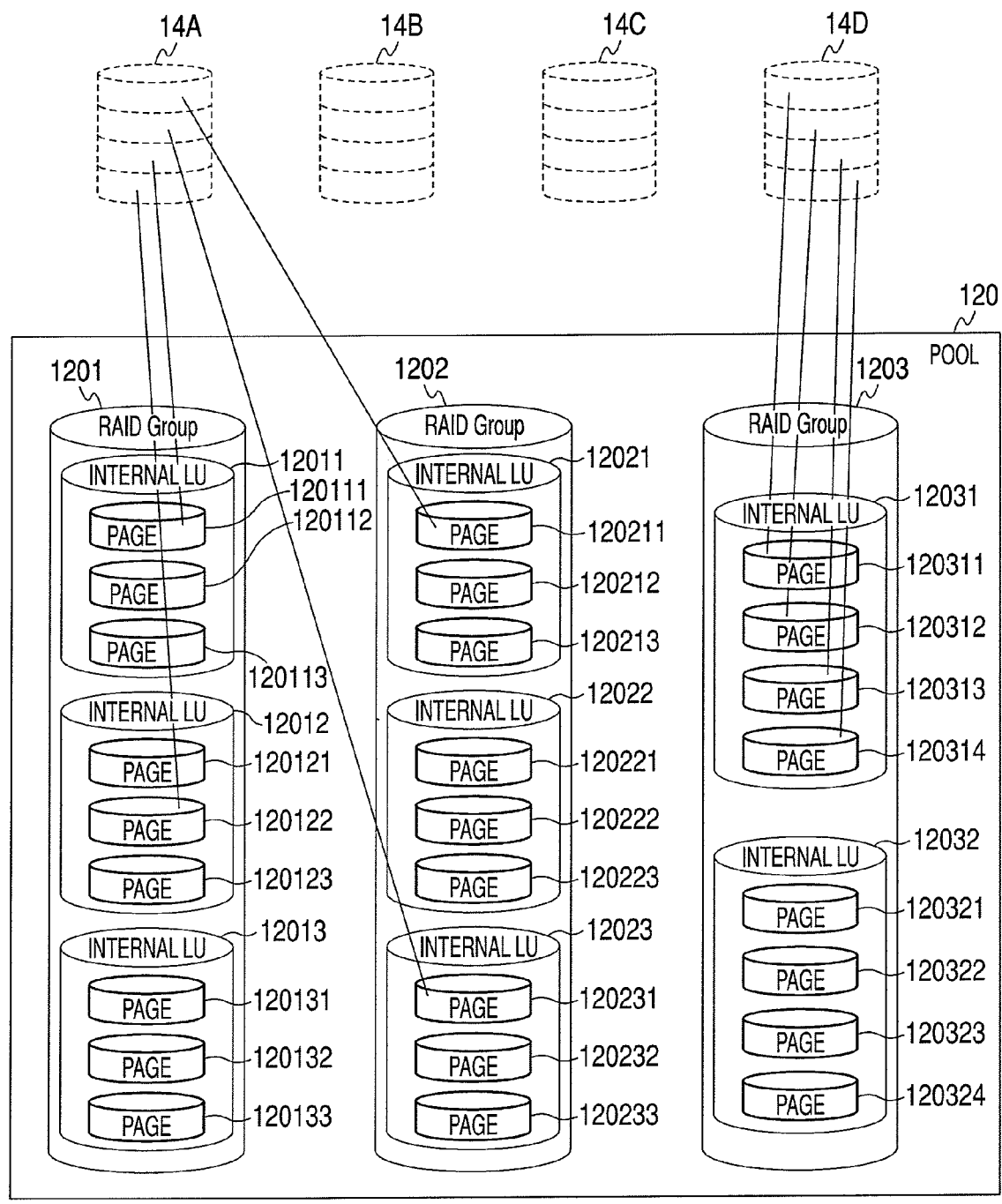
FIG. 20 is a view showing an example of page allocation in the case where the respective processes of the embodiment of the invention are performed.

FIG. 20 is a view showing an example of page allocation in the case where the respective processes of the embodiment of the invention are performed.

In the virtual volume 14A, since the access attribute 11844 is set to be random, as a result that the page reservation process and the page allocation process of the embodiment of the invention are executed, pages are allocated to be dispersed to the plural RAID Groups. Specifically, the pages 120111, 120122, 120211 and 120131 are allocated to the virtual volume 14A.

Besides, in the virtual volume 14D, since the access attribute 11844 is set to be sequential, as a result that the page reservation process and the page allocation process of the embodiment of the invention are executed, pages are continuously allocated to one RAID Group. Specifically, the pages 120311, 120312, 120313 and 120314 are allocated to the virtual volume 14D.

According to the invention, with respect to the page allocation of the virtual volume based on the access attribute, as shown in FIG. 20, in the virtual volume 14 in which the access attribute is random, pages are allocated to be dispersed in the plural RAID Groups. By this, since the virtual volume 14 becomes suitable for tasks, the performance can be more exhibited. Besides, in the virtual volume in which the access attribute is sequential, the pages are continuously allocated to one RAID Group. By this, for example, the virtual volume becomes suitable for storage of data to be backed up to the tape library apparatus 13. Accordingly, the performance is not reduced at the backup. Besides, access competition and the like can also be solved.

What is claimed is:

1. A storage system connected to a host computer, comprising
a plurality of disk drives and a controller to control the plurality of disk drives, wherein
the plurality of disk drives include a first disk drive group including at least one disk drive, and a second disk drive group including the disk drives the number of which is larger than that in the first disk drive group,
the host computer is provided with a logical volume including a plurality of logical storage areas,
information indicating that one of a first attribute and a second attribute is assigned to the logical volume is held,
when a new first logical volume including a plurality of first logical storage areas is provided to the host computer, the first attribute or the second attribute is assigned to the first logical volume,
when the first attribute is assigned to the first logical volume, a plurality of physical storage areas of the first disk drive group are reserved as first logical storage areas, and when a write request is issued from the host computer, the plurality of first logical storage areas included in the first logical volume are allocated as storage areas for storing data requested to be written by the host computer, and the data requested to be written by the host computer are stored in the plurality of physical storage areas of the first disk drive group in which the plurality of the allocated first logical storage areas are reserved,
when the second attribute is assigned to the first logical volume, a plurality of physical storage areas of the second disk drive group are reserved as the plurality of first logical storage areas, and when a write request is issued from the host computer, the plurality of first logical storage areas included in the first logical volume are allocated as storage areas for storing data requested to be written by the host computer, and the data requested to be written by the host computer are stored in the plurality of physical storage areas of the second disk drive group in which the plurality of the allocated first logical storage areas are reserved.

2. The storage system according to claim 1, wherein when the plurality of physical storage areas of the first disk drive group are reserved as the plurality of first storage areas, the storage system reserves the plurality of physical storage areas to which continuous addresses of the first disk drive group are assigned, and order of the continuous addresses corresponds to order of addresses assigned to the plurality of first logical storage areas.

3. The storage system according to claim 1, wherein when the data requested by the host computer is written in the first logical volume to which the first attribute is assigned, the storage system stores the data, and order of addresses of the reserved first logical storage area corresponds to order of addresses assigned to the requested data.

4. The storage system according to claim 1, wherein when the plurality of physical storage areas of the second disk drive group are reserved as the plurality of first storage areas, the storage system allocates the plurality of physical storage areas dispersed in the plurality of disk drives included in the second disk drive group to the plurality of first storage areas.

5. The storage system according to claim 1, wherein the first attribute indicates that the first logical volume to which the first attribute is assigned stores data which is sequentially accessed, and the second attribute indicates that the first logical volume to which the second attribute is assigned stores data which is accessed at random.

6. The storage system according to claim 1, wherein the storage system assigns the first attribute or the second attribute according to a usage of the first logical volume.

7. The storage system according to claim 1, further comprising a magnetic tape storage device connected to the controller,
wherein when data stored in the first logical volume is written in the magnetic tape storage device, the data stored in the first logical volume to which the first attribute is assigned is written in the magnetic tape storage device.

8. The storage system according to claim 1, wherein
the storage system provides the host computer with a second logical volume including a plurality of second logical storage areas,
the first logical volume to which the first attribute is assigned includes a plurality of unused third logical storage areas,
after data stored in the second logical volume is written in the first logical volume to which the first attribute is assigned, the storage system determines whether the plurality of first logical storage areas included in the first logical volume are continuously arranged in order of addresses assigned to the plurality of first logical storage areas,
when it is determined that the plurality of first logical storage areas included in the first logical volume, to which the first attribute is assigned, are not continuously arranged in the order of the addresses assigned to the plurality of first logical storage areas, the storage system determines whether continuous storage areas used by the first logical volume, to which the first attribute is assigned, can be secured in the plurality of third logical storage areas to which continuous addresses are assigned,
when it is determined that the continuous storage areas used by the first logical volume, to which the first attribute is assigned, can be secured in the third logical storage areas to which the continuous addresses are assigned, the storage system allocates the storage areas used by the first logical volume, to which the first attribute is assigned, in order of the addresses assigned to the plurality of third logical storage areas, and
the storage system reads the data stored in the first logical volume, to which the first attribute is assigned, in order of addresses assigned to the data, and stores the data read in the order of the addresses assigned to the plurality of third logical storage area into the plurality of third logical storage areas.

9. A logical storage area allocating method in a computer system including at least one host computer, and at least one storage system connected to the host computer through a network, wherein
the storage system includes a plurality of disk drives and a controller to control the plurality of disk drives,
the controller includes a first interface connected to the network, a second interface connected to the plurality of disk drives, a first processor connected to the first interface and the second interface, and a first memory connected to the processor, the host computer includes a third interface connected to the network, a second processor connected to the third interface, and a second memory connected to the second processor,
in the storage system, the plurality of disk drives includes a first disk drive group including at least one disk drive and a second disk drive group including the disk drives the number of which is larger than that in the first disk drive group,
the controller provides the host computer with a logical volume including a plurality of logical storage areas, and
the controller holds information indicating that one of a first attribute and a second attribute is assigned to the logical volume; and
the logical volume allocating method comprises
a step of, when a new first logical volume including a plurality of first logical storage areas is provided to the host computer, assigning one of the first attribute and the second attribute to the first logical volume,
a step of, when the first attribute is assigned to the first logical volume, reserving a plurality of physical storage areas of the first disk drive group as the first logical storage areas, a step of, when a write request is issued from the host computer, allocating the plurality of first logical storage areas included in the first logical volume as storage areas for storing data requested to be written by the host computer, a step of storing the data requested to be written by the host computer into the plurality of physical storage areas of the first disk drive group in which the plurality of the allocated first logical storage areas are reserved,
a step of, when the second attribute is assigned to the first logical volume, reserving a plurality of physical storage areas of the second disk drive group as the plurality of first logical storage areas, a step of, when a write request is issued from the host computer, allocating the plurality of first logical storage areas included in the first logical volume as storage areas for storing data requested to be written by the host computer, and a step of storing the data requested to be written by the host computer into the plurality of physical storage areas of the second disk drive group in which the plurality of the allocated first logical storage areas are reserved.

10. The logical storage area allocating method according to claim 9, further comprising a step of, when the plurality of physical storage areas of the first disk drive group are reserved as the plurality of first storage areas, reserving the plurality of physical storage areas to which continuous addresses of the first disk drive group are assigned to cause order of the continuous addresses to correspond to order of addresses assigned to the plurality of first logical storage areas.

11. The logical storage area allocating method according to claim 9, further comprising a step of, when the data requested by the host computer is written in the first logical volume to which the first attribute is assigned, storing the data to cause order of addresses of the reserved first logical storage areas to correspond to order of addresses assigned to the requested data.

12. The logical storage area allocating method according to claim 9, further comprising a step of, when the plurality of physical storage areas of the second disk drive group are reserved as the plurality of first storage areas, allocating the plurality of physical storage areas dispersed in the plurality of disk drives included in the second disk drive group to the plurality of first storage areas.

13. The logical storage area allocating method according to claim 9, further comprising a step of allocating one of the first attribute and the second attribute according to a usage of the first logical volume.

14. The logical storage area allocating method according to claim 9, wherein the storage system provides the host computer with a second logical volume including a plurality of second logical storage areas, the first logical volume to which the first attribute is assigned includes a plurality of unused third logical storage areas, and the logical storage area allocating method comprises a step of writing data stored in the second logical volume into the first logical volume to which the first attribute is assigned, and determining whether the plurality of first logical storage areas included in the first logical volume are continuously arranged in order of addresses assigned to the plurality of first logical storage areas, a step of, when it is determined that the plurality of first logical storage areas included in the first logical volume to which the first attribute is assigned are not continuously arranged in the order of the addresses assigned to the plurality of first logical storage areas, determining whether continuous storage areas used by the first logical volume to which the first attribute is assigned can be secured in the plurality of third logical storage areas to which continuous addresses are assigned, a step of, when it is determined that the continuous storage areas used by the first logical volume to which the first attribute is assigned can be secured in the third logical storage area to which the continuous addresses are assigned, allocating storage areas used by the first logical volume, to which the first attribute is assigned, in order of the addresses assigned to the plurality of third logical storage areas, and a step of reading data stored in the first logical volume, to which the first attribute is assigned, in the order of the addresses assigned to the data and storing the data read in the order of the addresses assigned to the plurality of third logical storage areas into the plurality of third logical storage areas.

15. A computer system including a storage system and a host computer connected to the storage system through a network, wherein the storage system includes a plurality of disk drives and a controller to control the plurality of disk drives, the controller includes a first interface connected to the network, a second interface connected to the plurality of disk drives, a processor connected to the first interface and the second interface, and a memory connected to the processor, in the storage system, the plurality of disk drives includes a first disk drive group including at least one disk drive and a second disk drive group including the disk drives the number of which is larger than that in the first disk drive group, a logical volume including a plurality of logical storage areas is provided to the host computer, the controller holds information indicating an attribute to be assigned to the first logical volume, when a new first logical volume including a plurality of first logical storage areas is provided to the host computer, the controller assigns one of a first attribute and a second attribute to the first logical volume, when the first attribute is assigned to the first logical volume, the controller reserves a plurality of physical storage areas of the first disk drive group as the first logical storage areas, when a write request is issued from the host computer, the controller allocates the plurality of first logical storage areas included in the first logical volume as storage areas for storing data requested to be written by the host computer, and stores the data requested to be written by the host computer into the plurality of physical storage areas of the first disk drive group in which the plurality of the allocated first logical storage areas are reserved, when the second attribute is assigned to the first logical volume, the controller reserves a plurality of physical storage areas of the second disk drive group as the plurality of first logical storage areas, and when a write request is issued from the host computer, the controller allocates the plurality of first logical storage areas included in the first logical volume as storage areas for storing data requested to be written by the host computer, and stores the data requested to be written by the host computer into the plurality of physical storage areas of the second disk drive group in which the plurality of the allocated first logical storage areas are reserved.

* * * * *